(12) United States Patent
Kato et al.

(10) Patent No.: US 6,654,078 B1
(45) Date of Patent: Nov. 25, 2003

(54) LIQUID CRYSTAL MODULE MOUNTING STRUCTURE AND MOBILE TERMINAL MOUNTED WITH THE SAME

(75) Inventors: Katsuhiro Kato, Tokyo (JP); Masatake Baba, Tokyo (JP); Michiaki Nishiyama, Tokyo (JP); Fumihiko Fujishiro, Tokyo (JP); Takakazu Yano, Tokyo (JP); Toshihisa Ogawa, Tokyo (JP); Tomoo Miwa, Tokyo (JP); Yasuhiro Sato, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 09/505,965

(22) Filed: Feb. 17, 2000

(30) Foreign Application Priority Data

Feb. 18, 1999 (JP) .......................... 11-040640

(51) Int. Cl.⁷ .......................... G02F 1/1333
(52) U.S. Cl. .......................... 349/58; 349/60
(58) Field of Search .......................... 349/58, 59, 60

(56) References Cited

U.S. PATENT DOCUMENTS

| | | | | |
|---|---|---|---|---|
| 5,400,160 A | * | 3/1995 | Takahashi et al. | 349/60 |
| 5,929,950 A | * | 7/1999 | Matsuda | 349/60 |
| 6,064,453 A | * | 5/2000 | Inubushi et al. | 349/58 |
| 6,292,239 B1 | * | 9/2001 | Nagamura et al. | 349/58 |
| 6,353,465 B1 | * | 3/2002 | Hashimoto et al. | 349/58 |
| 6,507,377 B1 | * | 1/2003 | Jung | 349/60 |

FOREIGN PATENT DOCUMENTS

| | | |
|---|---|---|
| JP | A 62-112191 | 5/1987 |
| JP | A 4-51595 | 2/1992 |
| JP | A 6-11718 | 1/1994 |
| JP | A 7-244274 | 9/1995 |
| JP | A 7-261675 | 10/1995 |
| JP | A 8-5998 | 1/1996 |
| JP | A 8-314389 | 11/1996 |
| JP | A 10-319864 | 12/1998 |
| KR | U 1998-063233 | 11/1998 |
| KR | A 1998-077247 | 11/1998 |

* cited by examiner

Primary Examiner—Toan Ton
Assistant Examiner—David Chung
(74) Attorney, Agent, or Firm—Young & Thompson

(57) ABSTRACT

The present invention provides a mounting structure for mounting a liquid crystal module to a cover of a mobile terminal. The mounting structure comprises: at least a pair of first and second engagement parts, wherein the first engagement part is provided on a side portion of the liquid crystal module, whilst the second engagement part is provided on a side portion of a structural member of the cover, so that the paired first and second engagement parts are engaged with each other only by fitting the liquid crystal module into the structural member of the cover.

2 Claims, 16 Drawing Sheets

LIQUID CRYSTAL MODULE MOUNTING STRUCTURE AND MOBILE TERMINAL MOUNTED WITH THE SAME

BACKGROUND OF THE INVENTION

The present invention relates to a liquid crystal module mounting structure, and more particularly to a structure for mounting a liquid crystal module serving as a display to a mobile terminal such as a note type personal computer or a laptop computer.

A liquid crystal module mounted to a note type personal computer or a laptop computer will be described. FIG. 1 is a perspective view illustrative of a note type personal computer or a laptop computer mounted with a liquid crystal module serving as a display. The personal computer comprises a body 20 and a cover 10. A liquid crystal module 1 serving as a display of the computer is mounted to the cover 10. The liquid crystal module 1 has a peripheral region surrounding a display area, and this peripheral region has a plurality of screw holes 1b. The cover 10 also has fixing parts 3 at positions corresponding to the screw holes 1b of the liquid crystal module 1. The liquid crystal module 1 is fixed to the cover 10 by screws 2 which are driven tightly into the screw holes 1b and engaged to the fixing parts 3 of the cover 10. A display area 1a of the liquid crystal module 1 is smaller in size than an entire part of the liquid crystal module 1 by the peripheral region on which the screw holes 1b are formed. Namely, it is difficult to enlarge the display area 1a of the liquid crystal module 1 without enlargement of the cover 10.

Further, a thickness of the liquid crystal module 1 is decided dependent upon the necessary length of the screws 2 on the basis of the necessary strength in tightly fixing the liquid crystal module 1 to the cover 10. Namely, it is difficult to reduce the thickness of the liquid crystal module 1 with keeping the necessary fixing strength.

In order to have solved the above problems with the conventional liquid crystal module mounting structure of FIG. 1, a side mount type liquid crystal module has been proposed. FIG. 2 is a perspective view illustrative of decomposed side mount type liquid crystal module mounting structure. A liquid crystal module 1 has two opposite side faces which are vertical to a display surface 1a of the liquid crystal module 1. Each of the two opposite side faces has two screw holes 4 which axes are parallel to the display surface 1a. The liquid crystal module 1 is engaged within inside walls of a bottom frame 5. The bottom frame 5 has two opposite side faces, each of which has two screw holes 5a at positions corresponding to the screw holes 4 of the liquid crystal module 1. The liquid crystal module 1 is engaged within the bottom frame 5, whereby the screw holes 4 of the liquid crystal module 1 are aligned to the corresponding screw holes Sa of the bottom frame 5. Screws 6 are driven tightly into the screw holes 5a and the screw holes 4, so as to tightly fix the liquid crystal module 1 to the bottom frame 5. A top frame 7 is placed on the bottom frame 5.

The above side mount type liquid crystal module has the following disadvantage. FIG. 3 is a fragmentary cross sectional elevation view illustrative of a mounting structure of a side mount type liquid crystal module to an outside frame. A liquid crystal module 1 is engaged within an outside frame 7 and a bottom frame 5, wherein a distance "d" is present between an inside wall of the outside frame 7 and a side face of a back-light portion 8 of the liquid crystal module 1, so that a screw 6 is driven into screw holes to penetrate the bottom frame 5 and the outside frame 7 and enters into the side portion of the liquid crystal module 1. The distance "d" is necessary as a margin for driving the screw 6. This distance "d" as the screw margin results in widening the liquid crystal module 1.

Further, a space defined in the distance "d" is formed between the outside frame 7 and the back-light portion 8. This space or the distance "d" makes small a ratio in area of a display surface 1a to the entire part of the liquid crystal module 1. The area of the liquid crystal module 1 is limited by the cover to which the liquid crystal module is mounted. Namely, the space or the distance "d" makes small a ratio in area of the display surface 1a to the entire part of the cover.

FIG. 4 is a fragmentary cross sectional elevation view illustrative of a side portion having a screw hole of an outside frame shown in FIG. 3. In view of securing a sufficient strength, a screw hole formation portion 4 for forming a screw hole for a screw 6 is made of a metal material, which is heavy more than a resin of a body of the outside frame 7. The metal material for the screw hole formation portion 4 of the outside frame 7 results in increase in weight of the mobile terminal.

Further, the screw 6 has a diameter "r". The screw hole formation portion 4 extends in a thickness direction of the liquid crystal module 1. This screw hole formation portion 4 has margins "m1" and "m2". A size of the screw hole formation portion 4 is "D" which is the sum of the diameter "r" of the screw 6 and the margins "m1" and "m2". Those margins "m1" and "m2" make it difficult to further reduce the thickness of the liquid crystal module 1.

The above screw formation portion 4 of the side mount type liquid crystal module is required to be formed to avoid a driver IC provided on the module. This means that a freedom in design of signal lines of the driver IC is reduced. The screw formation region of the side mount type liquid crystal module makes it difficult to obtain an optimum layout of the signal lines of the driver IC.

As described above, the screw formation region of the outside frame is made of a metal material, for which reason when the screw is driven through the screw hole in the screw formation region made of the metal material, then it is possible that a metal broken piece is generated, whereby the metal broken piece may form a short circuit on an electronic circuit.

The above described side mount liquid crystal module has a further disadvantage that if the mobile terminal mounted with the side mount liquid crystal module receives an external shock, then a mechanical stress due to the received shock is concentrated to the screw formation region of the outside frame. This mechanical stress concentration may provide damages to the liquid crystal panel and the outside frame.

The cover of the mobile terminal has the screw receiving portion for receiving the screw, for which reason a slide mold is necessary to form the cover. This means that the cost for forming the manufacturing line is high.

The screw receiving portion of the cover comprises a recessed portion which extends from the side face to an inside portion of the cover. The extension of the recessed portion as the screw receiving portion makes widen the width of the cover.

The side mount type liquid crystal module is inconvenient in removing the liquid crystal module from the cover by removing the screws in side direction.

The screw receiving portions are provided on side portions of the cover, for which reason the screw hole formation region is required to have a high strength by use of a high strength metal such as Mg allow which is, however, expensive and heavy and has a low formability.

In the above circumstances, it had been required to develop a novel liquid crystal module mounting structure for a mobile terminal free from the above problem.

SUMMARY OF THE INVENTION

Accordingly, it is an object of the present invention to provide a novel liquid crystal module mounting structure free from the above problems.

It is a further object of the present invention to provide a novel liquid crystal module mounting structure which allows size and weight reductions of the cover mounted with the liquid crystal module.

It is a still further object of the present invention to provide a novel liquid crystal module mounting structure which improves operability in assembling the cover.

It is yet a further object of the present invention to provide a novel liquid crystal module mounting structure which simplifies the manufacturing processes.

It is a further more object of the present invention to provide a cover mounted with a novel liquid crystal module mounting structure.

It is moreover object of the present invention to provide a mobile terminal with a cover mounted with a novel liquid crystal module mounting structure.

The present invention provides a mounting structure for mounting a liquid crystal module to a cover of a mobile terminal. The mounting structure comprises: at least a pair of first and second engagement parts, wherein the first engagement part is provided on a side portion of the liquid crystal module, whilst the second engagement part is provided on a side portion of a structural member of the cover, so that the paired first and second engagement parts are engaged with each other only by fitting the liquid crystal module into the structural member of the cover.

The second present invention provides a cover for a mobile terminal, wherein the cover has a frame member to which a liquid crystal module is mounted by a mounting structure of the first present invention.

The third present invention provides a mobile terminal comprising a body and a cover of the second present invention.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
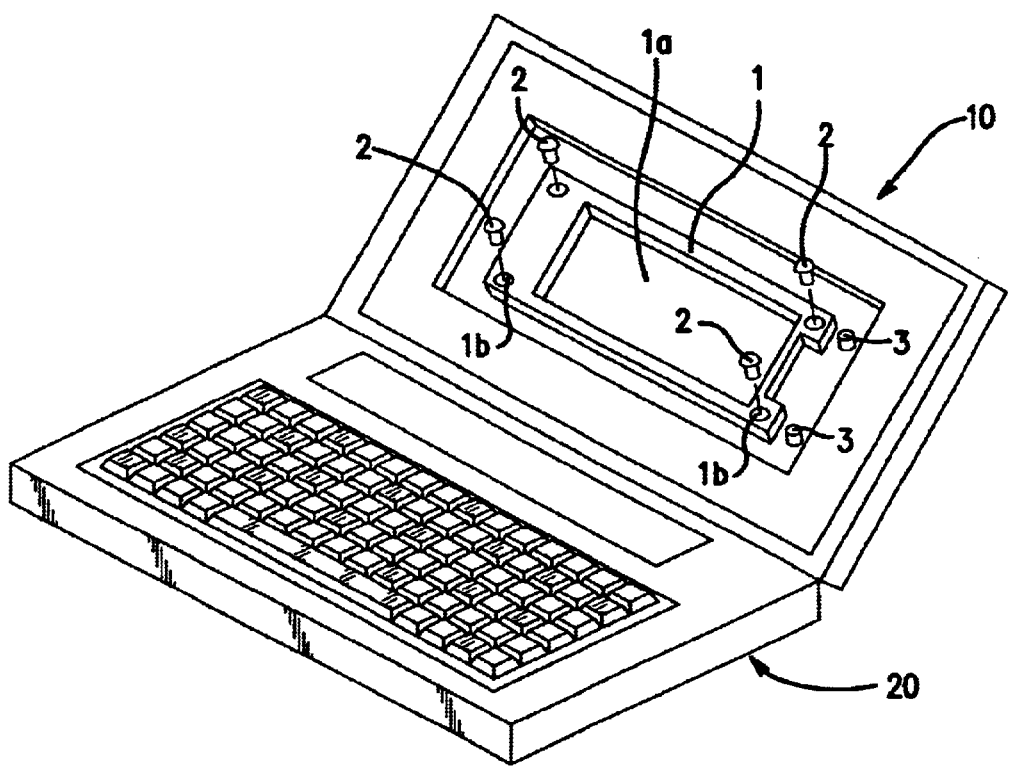
FIG. 1 is a perspective view illustrative of a note type personal computer mounted with a liquid crystal module serving as a display.
Figure 2:
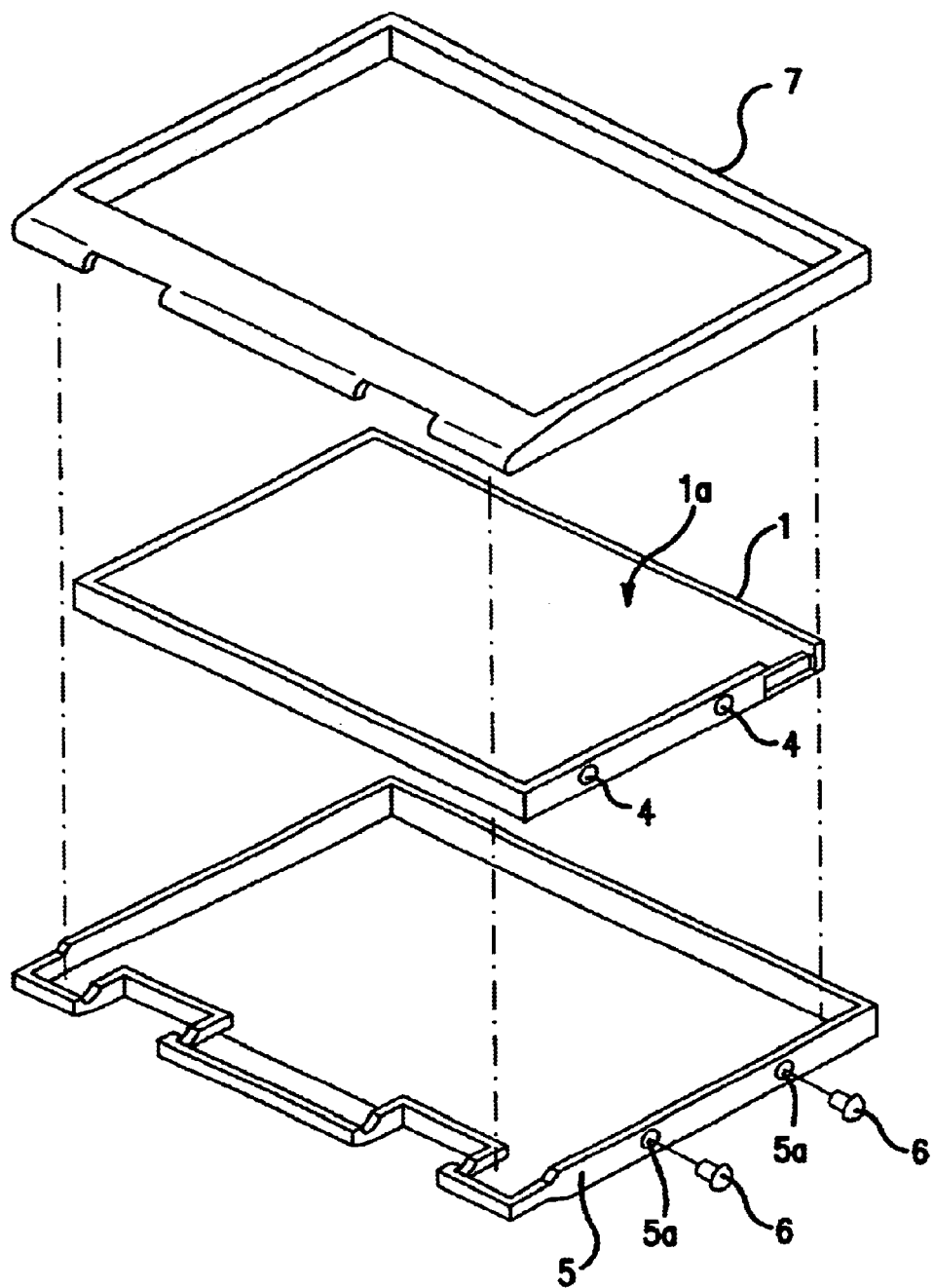
FIG. 2 is a perspective view of decomposed side mount type liquid crystal module mounting structure.
Figure 3:
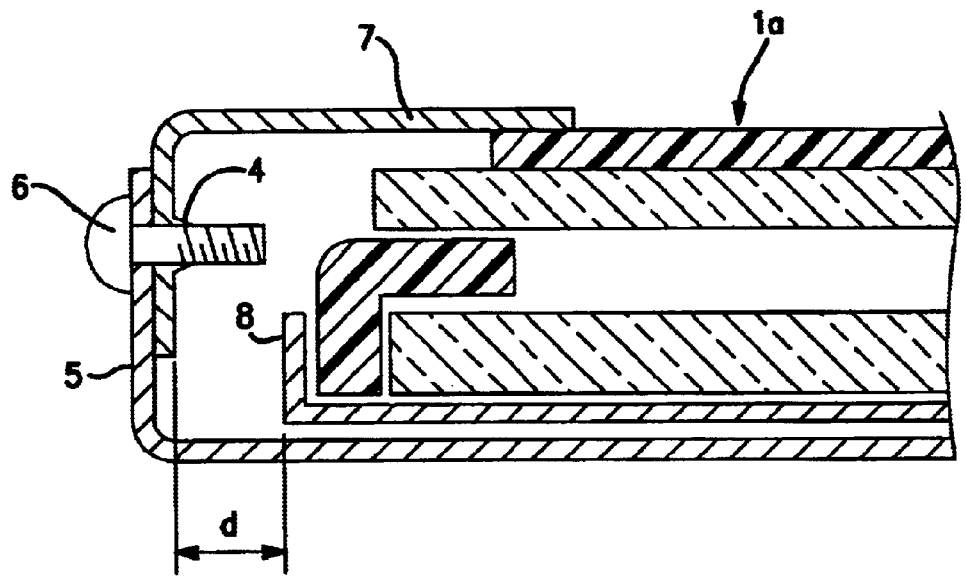
FIG. 3 is a fragmentary cross sectional elevation view illustrative of a mounting structure of a side mount type liquid crystal module to an outside frame.
Figure 4:
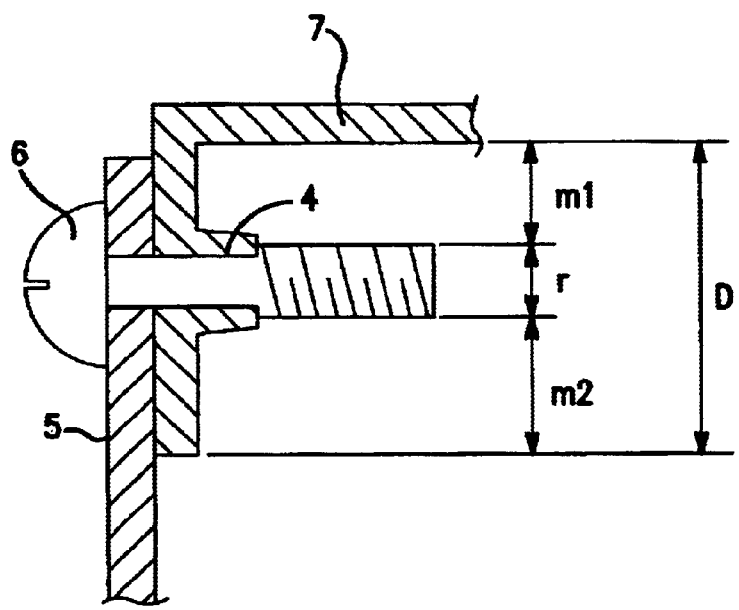
FIG. 4 is a fragmentary cross sectional elevation view illustrative of a side portion having a screw hole of an outside frame shown in FIG. 3.

The present invention provides a mounting structure for mounting a liquid crystal module to a cover of a mobile terminal. The mounting structure comprises: at least a pair of first and second engagement parts, wherein the first engagement part is provided on a side portion of the liquid crystal module, whilst the second engagement part is provided on a side portion of a structural member of the cover, so that the paired first and second engagement parts are engaged with each other only by fitting the liquid crystal module into the structural member of the cover.

In accordance with the present invention, the paired first and second engagement parts are provided on confronting side faces of the liquid crystal module and the structural member of the cover respectively so that only fitting the liquid crystal module into the structural member of the cover causes the paired first and second engagement parts to be engaged with each other, thereby to mount the liquid crystal module to the structural member of the cover. This novel mounting structure does never need to provide a screw formation region of the conventional mounting structure described above. Namely, the novel mounting structure does never utilizes the screw.

Thus, the screw-free mounting structure in accordance with the present invention is free from the conventional problem in that the thickness of the liquid crystal module should be decided dependent upon the screws on the basis of the necessary strength in tightly fixing the liquid crystal module to the cover. Namely, the screw-free mounting structure makes it possible to reduce the thickness of the liquid crystal module with keeping the necessary fixing or mounting strength.

Thus, the screw-free mounting structure in accordance with the present invention is free from the conventional problem with the conventional side mount type liquid crystal module mounting structure. No use of screws nor formations of screw holes do need no margin on the side portions for driving the screws, resulting in narrowing the width of the liquid crystal module. Further, no space is formed between the outside frame and the back-light portion. No space makes it possible to increase a ratio in area of a display surface to the entire part of the liquid crystal module, even the area of the liquid crystal module is limited by the cover to which the liquid crystal module is mounted.

No use of the screws further provide the following advantages. No use of the screws needs no formation of the screw hole formation portion which should have to be made of a metal material, which is heavy more than a resin of a body of the outside frame. No use of the metal material for the outside frame results in reduction in weight of the mobile terminal.

Further, no use of the screw results in no screw hole formation portion extending in a thickness direction of the liquid crystal module. No screw hole formation portion does not need any margins. No margins make it possible to further reduce the thickness of the liquid crystal module.

No formation of any screw formation portion makes the mobile terminal free from the conventional problem with limitation in laying out the driver IC. This means that a freedom in design of signal lines of the driver IC is increased. No formation of the screw formation region makes it possible to obtain an optimum layout of the signal lines of the driver IC.

As described above, no use of metal material further provides an advantage in being free from the conventional problem with a possible generation of a metal broken piece, which may form a short circuit on an electronic circuit.

No use of the screws nor formation of the screw formation regions further provide an advantage in being free from the conventional problem in that if the mobile terminal mounted with the side mount liquid crystal module receives an external shock, then a mechanical stress due to the received shock is concentrated to the screw formation region. No use of the screws nor formation of the screw formation regions makes the liquid crystal panel and the outside frame free from damages due to the mechanical stress due to the received shock.

The cover of the mobile terminal has no screw receiving portion for receiving the screw, for which reason a slide mold is not necessary to form the cover. This means that the cost for forming the manufacturing line may be reduced.

The above novel mounting structure of the liquid crystal module is convenient in removing the liquid crystal module from the cover because the paired first and second engagement parts provided on the side faces of the liquid crystal module and the structural frame of the cover are engaged with each other by only a single operation of fitting the liquid crystal module into the structural frame of the cover.

No use of the screws means no formation of the screw receiving portions, for which reason the screw hole formation region is required to have a high strength by use of a high strength metal such as Mg allow which is, however, expensive and heavy and has a low formability.

The term "structural frame" means to include both a bottom plate portion of the cover, wherein the back face of the liquid crystal module faces to the bottom plate portion of the cover when the liquid crystal module is fitted into the cover, and an outside frame which comes together with the side faces of the liquid crystal module.

It is preferable that plural pairs of the first and second engagement parts are provided, so that a plurality of the first engagement parts are provided on side faces of the liquid crystal module whilst a plurality of the second engagement parts are provided on side faces of the structural member of the cover. The plural pairs of the first and second engagement parts are preferable to secure the mounting of the liquid crystal module to the cover. This mounting structure does not use the screws, for which reason the above described advantages caused by no use of the screws can be obtained.

It is further preferable that plural pairs of the first and second engagement parts are provided symmetrically in first and second directions perpendicular to each other and vertical to a display surface of the liquid crystal module to obtain balances in position. This mounting structure does not use the screws, for which reason the above described advantages caused by no use of the screws can be obtained.

It is also preferable that the second engagement part is provided on a reinforcement member attached along the side face of the structural member of the cover. In order to increase the mechanical strength of the liquid crystal module, it is effective that the liquid crystal module is attached to the reinforcement member attached along the side face of the structural member of the cover. Since the second engagement part is provided on the reinforcement member, it is not necessary to provide the second engagement part on the structural member of the cover. The structural member of the cover may be made of a plastic. The provision of the metal reinforcement members which increase the mechanical strength allows a reduction of the mechanical strengths of the structural members of the cover. This means it possible to reduce the weights of the structural members of the cover, whereby the weight of the cover can be reduced. Further, the reinforcement members with the engagement parts are attached to the structural members of the cover, for which reason the structural members made of the plastic is free of any engagement portions for allowing the liquid crystal module to be mounted to the structural members of the cover, whereby the number of the necessary molding processes for forming the structural members of the cover made of the plastic can be reduced. The reduction in the number of the necessary molding processes for forming the structural members of the cover allows a reduction of the manufacturing cost. Further, the structural members of the cover may be common to various changes in positions and sizes of the engagement parts provided on the liquid crystal module, because the engagement parts provided on the reinforcement members are adjusted to the changes in positions and sizes of the engagement parts. This can respond to the requirement for various changes in design with keeping the reduction in the manufacturing cost. In addition, this mounting structure does not use the screws, for which reason the above described advantages caused by no use of the screws can be obtained.

It is also preferable that the first engagement part comprises a projecting portion whilst the second engagement part comprises a recessed portion for receiving the projecting portion. This structure is extremely simple so that the projecting portion as the first engagement part provided on the side face of the liquid crystal module is engaged or fitted into the recessed portion when the liquid crystal module is fitted into the structural frame of the cover. In this case, it is further preferable that the projecting portion is flexible to allow the projecting portion to snap into the recessed portion. This mounting structure does not use the screws, for which reason the above described advantages caused by no use of the screws can be obtained.

It is also preferable that the projecting portion is flexible to allow the projecting portion to be caulked into the recessed portion. Caulking the projecting portion into the recessed portion increases the strength of the connection between them, whereby the strength of mounting the liquid crystal module to the structural frame of the cover is increased. This mounting structure does not use the screws, for which reason the above described advantages caused by no use of the screws can be obtained.

It is also preferable that the second engagement part comprises a projecting portion whilst the first engagement part comprises a recessed portion for receiving the projecting portion. This structure is extremely simple so that the projecting portion as the second engagement part provided on the side face of the structural frame of the cover is engaged or fitted to the recessed portion provided on the side face of the liquid crystal module when the liquid crystal module is fitted into the structural frame of the cover. In this case, it is further preferable that the projecting portion is flexible to allow the projecting portion to snap into the recessed portion. This mounting structure does not use the screws, for which reason the above described advantages caused by no use of the screws can be obtained.

It is also preferable that the projecting portion is flexible to allow the projecting portion to be caulked into the recessed portion. Caulking the projecting portion into the recessed portion increases the strength of the connection between them, whereby the strength of mounting the liquid crystal module to the structural frame of the cover is increased. This mounting structure does not use the screws, for which reason the above described advantages caused by no use of the screws can be obtained.

It is also preferable that the first engagement part comprises a projecting portion whilst the second engagement part comprises a guide groove for guiding and receiving the projecting portion. In this case, it is further preferable that the guide groove comprises: a first groove portion having an opening for introducing the projecting portion; and a second groove portion bring connected with the first groove portion for guiding the projecting portion, and wherein the first groove portion extends in a first direction along a thickness direction of the structural member of the cover, whilst the second groove portion extends in a second direction perpendicular to the first direction and also extends along a longitudinal axis of the side face of the structural member of the cover. This mounting structure does not use the screws, for which reason the above described advantages caused by no use of the screws can be obtained, It is also preferable that the structural member of the cover has a holder for holding the projecting portion. The holder prevents a relative motion between the first and second engagement parts, thereby preventing the relative motion between the liquid crystal module and the structural frame of the cover. This structure may increase the strength of connection between the first and second engagement parts, thereby increasing the strength of mounting the liquid crystal module to the structural frame of the cover. This mounting structure does not use the screws, for which reason the above described advantages caused by no use of the screws can be obtained.

It is also preferable that the second engagement part comprises a projecting portion whilst the first engagement part comprises a guide groove for guiding and receiving the projecting portion. In this case, it is also preferable that the guide groove comprises: a first groove portion having an opening for introducing the projecting portion; and a second groove portion being connected with the first groove portion for guiding the projecting portion, and wherein the first groove portion extends in a first direction along a thickness direction of the liquid crystal module, whilst the second groove portion extends in a second direction perpendicular to the first direction and also extends along a longitudinal axis of the side face of the liquid crystal module. This mounting structure does not use the screws, for which reason the above described advantages caused by no use of the screws can be obtained.

It is also preferable that the side face of the liquid crystal module has a holder for holding the projecting portion. The holder prevents a relative motion between the first and second engagement parts, thereby preventing the relative motion between the liquid crystal module and the structural frame of the cover. This structure may increase the strength of connection between the first and second engagement parts, thereby increasing the strength of mounting the liquid crystal module to the structural frame of the cover. This mounting structure does not use the screws, for which reason the above described advantages caused by no use of the screws can be obtained.

It is preferable that the first engagement part comprises an L-shaped flexible plate which further comprises: a first flexible plate part extending in a thickness direction of the liquid crystal module from an edge of the side face of the liquid crystal module; and a second flexible plate part extending perpendicular to the first flexible plate part and in parallel to a surface of the liquid crystal module, so that the second flexible plate part is separated from the surface of the liquid crystal module by a space, and further an inside surface of the second flexible plate part facing to the space has a projection which projects into the space and toward the surface of the liquid crystal module, and wherein the second engagement part comprises a plate member which further has: an opening for introducing the second flexible plate part; a guide groove connected with the opening for guiding the first flexible plate part to allow the second flexible plate part to slide on an opposite surface of the plate member to the surface of the liquid crystal module; and a hole for allowing the projection provided on the second flexible plate part to snap into the hole when the first flexible plate part is guided along the guide groove and the second flexible plate part slides on the opposite surface of the plate member. The liquid crystal module is supported by the line segments comprising the grooves. This structure relaxes the mechanical stress or prevents the mechanical stress concentration to points when the liquid crystal module receives the external stress such as the external shock. The relaxation to the mechanical stress or prevention of the mechanical stress concentration may prevent the liquid crystal module and the cover from being broken. This mounting structure does not use the screws, for which reason the above described advantages caused by no use of the screws can be obtained.

It is also preferable that the second engagement part comprises an L-shaped flexible plate which further comprises: a first flexible plate part extending in a thickness direction of the cover from an edge of the side face of the structural member of the cover; and a second flexible plate part extending perpendicular to the first flexible plate part and in parallel to a surface of the cover, so that the second flexible plate part is separated from the surface of the cover by a space, and further an inside surface of the second flexible plate part facing to the space has a projection which projects into the space and toward the surface of the cover, and wherein the first engagement part comprises a plate member which further has: an opening for introducing the second flexible plate part; a guide groove connected with the opening for guiding the first flexible plate part to allow the second flexible plate part to slide on an opposite surface of the plate member to the surface of the cover; and a hole for allowing the projection provided on the second flexible plate part to snap into the hole when the first flexible plate part is guided along the guide groove and the second flexible plate part slides on the opposite surface of the plate member. The liquid crystal module is supported by the line segments comprising the grooves. This structure relaxes the mechanical stress or prevents the mechanical stress concentration to points when the liquid crystal module receives the external stress such as the external shock. The relaxation to the mechanical stress or prevention of the mechanical stress concentration may prevent the liquid crystal module and the cover from being broken. This mounting structure does not use the screws, for which reason the above described advantages caused by no use of the screws can be obtained.

It is also preferable that a pair of the first and second engagement parts comprises an adhesive tape having opposite surfaces capable of adhering the liquid crystal module and the structural member of the cover respectively. This mounting structure does not use the screws, for which reason the above described advantages caused by no use of the screws can be obtained.

It is also preferable that the first engagement part comprises a rotational module holder for holding one side face of the liquid crystal module whilst the second engagement part comprises a holder supporter for mechanically and pivotally supporting the rotational module supporter so as to allow the rotational module holder to rotate around a longitudinal axis of the rotational module holder and also for fixing the rotational module holder at a predetermined angle. The liquid crystal module is supported by the separate positions, This structure relaxes the mechanical stress or prevents the mechanical stress concentration to points when the liquid crystal module receives the external stress such as the external shock. The relaxation to the mechanical stress or prevention of the mechanical stress concentration may prevent the liquid crystal module and the cover from being broken. The rotational module holder serves as a reinforcement member to increase the mechanical strength of the liquid crystal module. No need to form the engagement parts on the liquid crystal module simplifies the manufacturing process, whereby the manufacturing cost can be reduced and a freedom in design of the liquid crystal module can also be increased. This mounting structure does not use the screws, for which reason the above described advantages caused by no use of the screws can be obtained. This mounting structure does not use the screws, for which reason the above described advantages caused by no use of the screws can be obtained.

It is also preferable that the rotational module holder comprises a body extending along the one side face of the liquid crystal module; a pair of first cylindrically shaped projections projecting outwardly from opposite side faces of the body; and a pair of second cylindrically shaped projections projecting outwardly from opposite side faces of the body, whilst the holder supporter comprises a pair of plate members confronting with the opposite side faces of the body, and the pair of the plate members also have: a pair of first circular shaped holes receiving the first cylindrically shaped projections for pivotally supporting the body of the rotational module holder and allowing the rotational module holder to rotate around the longitudinal axis of the rotational module holder; and a pair of second circular shaped holes receiving the second cylindrically shaped projections for allowing the second cylindrically shaped projections to snap into the second circular shaped holes thereby to fix the rotational module holder The liquid crystal module is supported by the separate positions. This structure relaxes the mechanical stress or prevents the mechanical stress concentration to points when the liquid crystal module receives the external stress such as the external shock. The relaxation to the mechanical stress or prevention of the mechanical stress concentration may prevent the liquid crystal module and the cover from being broken. This mounting structure does not use the screws, for which reason the above described advantages caused by no use of the screws can be obtained. The rotational module holder serves as a reinforcement member to increase the mechanical strength of the liquid crystal module. No need to form the engagement parts on the liquid crystal module simplifies the manufacturing process, whereby the manufacturing cost can be reduced and a freedom in design of the liquid crystal module can also be increased. This mounting structure does not use the screws, for which reason the above described advantages caused by no use of the screws can be obtained. In this cause, it is further preferable that the second engagement part further comprises a fix module holder for holding an opposite side of the liquid crystal module to the one side face of the liquid crystal module. It is further more preferable that the fix module holder further has a pushing member for pushing the opposite side of the liquid crystal module toward the rotational module holder in order to securely position the liquid crystal module without clattering.

The second present invention provides a cover for a device, the cover having a frame member for mounting a liquid crystal module by a mounting structure of the foregoing first present invention.

The third present invention provides a mobile terminal comprising a body and a cover of the above second present invention.

The fourth present invention provides a mounting structure for mounting a liquid crystal module to a cover of a mobile terminal. The mounting structure comprises: at least an adhesive tape having opposite surfaces capable of adhering a back face of the liquid crystal module and a bottom plate portion of the cover respectively, so that the liquid crystal module is adhered through said at least adhesive tape to the bottom plate portion of the cover.

In accordance with the present invention, the adhesive tapes are provided on the back face of the liquid crystal module and confronting back plate portion of the cover respectively so that only fitting the liquid crystal module into the structural member of the cover causes adhering the liquid crystal module to the cover. This novel mounting structure does never need to provide a screw formation region of the conventional mounting structure described above. Namely, the novel mounting structure does never utilizes the screw.

Thus, the screw-free mounting structure in accordance with the present invention is free from the conventional problem in that the thickness of the liquid crystal module should be decided dependent upon the screws on the basis of the necessary strength in tightly fixing the liquid crystal module to the cover. Namely, the screw-free mounting structure makes it possible to reduce the thickness of the liquid crystal module with keeping the necessary fixing or mounting strength.

Thus, the screw-free mounting structure in accordance with the present invention is free from the conventional problem with the conventional side mount type liquid crystal module mounting structure. No use of screws nor formations of screw holes do need no margin on the side portions for driving the screws, resulting in narrowing the width of the liquid crystal module. Further, no space is formed between the outside frame and the back-light portion. No space makes it possible to increase a ratio in area of a display surface to the entire part of the liquid crystal module, even the area of the liquid crystal module is limited by the cover to which the liquid crystal module is mounted.

No use of the screws further provide the following advantages. No use of the screws needs no formation of the screw hole formation portion which should have to be made of a metal material, which is heavy more than a resin of a body of the outside frame. No use of the metal material for the outside frame results in reduction in weight of the mobile terminal.

Further, no use of the screw results in no screw hole formation portion extending in a thickness direction of the liquid crystal module. No screw hole formation portion does not need any margins. No margins make it possible to further reduce the thickness of the liquid crystal module.

No formation of any screw formation portion makes the mobile terminal free from the conventional problem with limitation in laying out the driver IC. This means that a freedom in design of signal lines of the driver IC is increased. No formation of the screw formation region makes it possible to obtain an optimum layout of the signal lines of the driver IC.

As described above, no use of metal material further provides an advantage in being free from the conventional problem with a possible generation of a metal broken piece, which may form a short circuit on an electronic circuit.

No use of the screws nor formation of the screw formation regions further provide an advantage in being free from the conventional problem in that if the mobile terminal mounted with the side mount liquid crystal module receives an external shock, then a mechanical stress due to the received shock is concentrated to the screw formation region. No use of the screws nor formation of the screw formation regions makes the liquid crystal panel and the outside frame free from damages due to the mechanical stress due to the received shock.

The cover of the mobile terminal has no screw receiving portion for receiving the screw, for which reason a slide mold is not necessary to form the cover. This means that the cost for forming the manufacturing line may be reduced.

The above novel mounting structure of the liquid crystal module is convenient in removing the liquid crystal module from the cover because the liquid crystal module and the back plate portion of the cover are adhered with each other via the adhesive tape by only a single operation of fitting the liquid crystal module into the back plate portion of the cover.

No use of the screws means no formation of the screw receiving portions, for which reason the screw hole formation region is required to have a high strength by use of a high strength metal such as Mg allow which is, however, expensive and heavy and has a low formability.

It is preferable that plural adhesive tape are provided symmetrically.

The fifth present invention provides a cover for a device, the cover having a frame member for mounting a liquid crystal module by a mounting structure of the foregoing fourth present invention.

The sixth present invention provides a mobile terminal comprising a body and a cover of the above fifth present invention.

The seventh present invention provides a mounting structure for mounting a display module to a cover of a mobile terminal. The mounting structure comprises: at least a pair of first and second engagement parts, wherein the first engagement part is provided on the display module, whilst the second engagement part is provided on a structural member of the cover, so that the paired first and second engagement parts are engaged with each other only by fitting the display module into the structural member of the cover. It is preferable that plural pairs of the first and second engagement parts are provided, so that a plurality of the first engagement parts are provided on side faces of the display module whilst a plurality of the second engagement parts are provided on side faces of the structural member of the cover. The plural pairs of the first and second engagement parts ate preferable to secure the mounting of the display module to the cover.

In accordance with the present invention, the paired first and second engagement parts are provided on confronting side faces of the display module and the structural member of the cover respectively so that only fitting the display module into the structural member of the cover causes the paired first and second engagement parts to be engaged with each other, thereby to mount the display module to the structural member of the cover. This novel mounting structure does never need to provide a screw formation region of the conventional mounting structure described above. Namely, the novel mounting structure does never utilizes the screw.

Thus, the screw-free mounting structure in accordance with the present invention is free from the conventional problem in that the thickness of the display module should be decided dependent upon the screws on the basis of the necessary strength in tightly fixing the display module to the cover. Namely, the screw-free mounting structure makes it possible to reduce the thickness of the display module with keeping the necessary fixing or mounting strength.

Thus, the screw-free mounting structure in accordance with the present invention is free from the conventional problem with the conventional side mount type display module mounting structure. No use of screws nor formations of screw holes do need no margin on the side portions for driving the screws, resulting in narrowing the width of the display module. Further, no space is formed between the outside frame and the back-light portion. No space makes it possible to increase a ratio in area of a display surface to the entire part of the display module, even the area of the display module is limited by the cover to which the display module is mounted.

No use of the screws further provide the following advantages. No use of the screws needs no formation of the screw hole formation portion which should have to be made of a metal material, which is heavy more than a resin of a body of the outside frame. No use of the metal material for the outside frame results in reduction in weight of the mobile terminal.

Further, no use of the screw results in no screw hole formation portion extending in a thickness direction of the display module. No screw hole formation portion does not need any margins. No margins make it possible to further reduce the thickness of the display module.

No formation of any screw formation portion makes the mobile terminal free from the conventional problem with limitation in laying out the driver IC. This means that a freedom in design of signal lines of the driver IC is increased. No formation of the screw formation region makes it possible to obtain an optimum layout of the signal lines of the driver IC.

As described above, no use of metal material further provides an advantage in being free from the conventional problem with a possible generation of a metal broken piece, which may form a short circuit on an electronic circuit.

No use of the screws nor formation of the screw formation regions further provide an advantage in being free from the conventional problem in that if the mobile terminal mounted with the side mount display module receives an external shock, then a mechanical stress due to the received shock is concentrated to the screw formation region. No use of the screws nor formation of the screw formation regions makes the display panel and the outside frame free from damages due to the mechanical stress due to the received shock.

The cover of the mobile terminal has no screw receiving portion for receiving the screw, for which reason a slide mold is not necessary to form the cover. This means that the cost for forming the manufacturing line may be reduced.

The above novel mounting structure of the display module is convenient in removing the display module from the cover because the paired first and second engagement parts provided on the side faces of the display module and the structural frame of the cover are engaged with each other by only a single operation of fitting the display module into the structural frame of the cover.

No use of the screws means no formation of the screw receiving portions, for which reason the screw hole formation region is required to have a high strength by use of a high strength metal such as Mg allow which is, however, expensive and heavy and has a low formability.

The term "structural frame" means to include both a bottom plate portion of the cover, wherein the back face of the display module faces to the bottom plate portion of the cover when the display module is fitted into the cover, and an outside frame which comes together with the side faces of the display module.

It is further preferable that plural pairs of the first and second engagement parts are provided symmetrically in first and second directions perpendicular to each other and vertical to a display surface of the display module to obtain balances in position. This mounting structure does not use the screws, for which reason the above described advantages caused by no use of the screws can be obtained.

It is also preferable that the second engagement part is provided on a reinforcement member attached along the side face of the structural member of the cover. In order to increase the mechanical strength of the display module, it is effective that the display module is attached to the reinforcement member attached along the side face of the structural member of the cover. Since the second engagement part is provided on the reinforcement member, it is not necessary to provide the second engagement part on the structural member of the cover. The structural member of the cover may be made of a plastic. The provision of the metal reinforcement members which increase the mechanical strength allows a reduction of the mechanical strengths of the structural members of the cover. This means it possible to reduce the weights of the structural members of the cover, whereby the weight of the cover can be reduced. Further, the reinforcement members with the engagement parts are attached to the structural members of the cover, for which reason the structural members made of the plastic is free of any engagement portions for allowing the display module to be mounted to the structural members of the cover, whereby the number of the necessary molding processes for forming the structural members of the cover made of the plastic can be reduced. The reduction in the number of the necessary molding processes for forming the structural members of the cover allows a reduction of the manufacturing cost. Further, the structural members of the cover may be common to various changes in positions and sizes of the engagement parts provided on the display module, because the engagement parts provided on the reinforcement members are adjusted to the changes in positions and sizes of the engagement parts. This can respond to the requirement for various changes in design with keeping the reduction in the manufacturing cost. In addition, this mounting structure does not use the screws, for which reason the above described advantages caused by no use of the screws can be obtained.

It is also preferable that the first engagement part comprises a projecting portion whilst the second engagement part comprises a recessed portion for receiving the projecting portion. This structure is extremely simple so that the projecting portion as the first engagement part provided on the side face of the display module is engaged or fitted into the recessed portion when the display module is fitted into the structural frame of the cover. In this case, it is further preferable that the projecting portion is flexible to allow the projecting portion to snap into the recessed portion. This mounting structure does not use the screws, for which reason the above described advantages caused by no use of the screws can be obtained.

It is also preferable that the projecting portion is flexible to allow the projecting portion to be caulked into the recessed portion. Caulking the projecting portion into the recessed portion increases the strength of the connection between them, whereby the strength of mounting the display module to the structural frame of the cover is increased. This mounting structure does not use the screws, for which reason the above described advantages caused by no use of the screws can be obtained.

It is also preferable that the second engagement part comprises a projecting portion whilst the first engagement part comprises a recessed portion for receiving the projecting portion. This structure is extremely simple so that the projecting portion as the second engagement part provided on the side face of the structural frame of the cover is engaged or fitted to the recessed portion provided on the side face of the display module when the display module is fitted into the structural frame of the cover. In this case, it is further preferable that the projecting portion is flexible to allow the projecting portion to snap into the recessed portion. This mounting structure does not use the screws, for which reason the above described advantages caused by no use of the screws can be obtained.

It is also preferable that the projecting portion is flexible to allow the projecting portion to be caulked into the recessed portion. Caulking the projecting portion into the recessed portion increases the strength of the connection between them, whereby the strength of mounting the display module to the structural frame of the cover is increased. This mounting structure does not use the screws, for which reason the above described advantages caused by no use of the screws can be obtained.

It is also preferable that the first engagement part comprises a projecting portion whilst the second engagement part comprises a guide groove for guiding and receiving the projecting portion. In this case, it is further preferable that the guide groove comprises: a first groove portion having an opening for introducing the projecting portion; and a second groove portion being connected with the first groove portion for guiding the projecting portion, and wherein the first groove portion extends in a first direction along a thickness direction of the structural member of the cover, whilst the second groove portion extends in a second direction perpendicular to the first direction and also extends along a longitudinal axis of the side face of the structural member of the cover. This mounting structure does not use the screws, for which reason the above described advantages caused by no use of the screws can be obtained.

It is also preferable that the structural member of the cover has a holder for holding the projecting portion. The holder prevents a relative motion between the first and second engagement parts, thereby preventing the relative motion between the display module and the structural frame of the cover. This structure may increase the strength of connection between the first and second engagement parts, thereby increasing the strength of mounting the display module to the structural frame of the cover. This mounting structure does not use the screws, for which reason the above described advantages caused by no use of the screws can be obtained.

It is also preferable that the second engagement part comprises a projecting portion whilst the first engagement part comprises a guide groove for guiding and receiving the projecting portion. In this case, it is also preferable that the guide groove comprises; a first groove portion having an opening for introducing the projecting portion; and a second groove portion being connected with the first groove portion for guiding the projecting portion, and wherein the first groove portion extends in a first direction along a thickness direction of the display module, whilst the second groove portion extends in a second direction perpendicular to the first direction and also extends along a longitudinal axis of the side face of the display module. This mounting structure does not use the screws, for which reason the above described advantages caused by no use of the screws can be obtained.

It is also preferable that the side face of the display module has a older for holding the projecting portion. The holder prevents a relative motion between the first and second engagement parts, thereby preventing the relative motion between the display module and the structural frame of the cover. This structure may increase the strength of connection between the first and second engagement parts, thereby increasing the strength of mounting the display module to the structural frame of the cover. This mounting structure does not use the screws, for which reason the above described advantages caused by no use of the screws can be obtained.

It is preferable that the first engagement part comprises an L-shaped flexible plate which further comprises a first flexible plate part extending in a thickness direction of the display module from an edge of the side face of the display module; and a second flexible plate part extending perpendicular to the first flexible plate part and in parallel to a surface of the display module, so that the second flexible plate part is separated from the surface of the display module by a space, and further an inside surface of the second flexible plate part facing to the space has a projection which projects into the space and toward the surface of the display module, and wherein the second engagement part comprises a plate member which further has an opening for introducing the second flexible plate part; a guide groove connected with the opening for guiding the first flexible plate part to allow the second flexible plate part to slide on an opposite surface of the plate member to the surface of the display module; and a hole for allowing the projection provided on the second flexible plate part to snap into the hole when the first flexible plate part is guided along the guide groove and the second flexible plate part slides on the opposite surface of the plate member. The display module is supported by the line segments comprising the grooves. This structure relaxes the mechanical stress or prevents the mechanical stress concentration to points when the display module receives the external stress such as the external shock. The relaxation to the mechanical stress or prevention of the mechanical stress concentration may prevent the display module and the cover from being broken. This mounting structure does not use the screws, for which reason the above described advantages caused by no use of the screws can be obtained.

It is also preferable that the second engagement part comprises an L-shaped flexible plate which further comprises: a first flexible plate part extending in a thickness direction of the cover from an edge of the side face of the structural member of the cover; and a second flexible plate part extending perpendicular to the first flexible plate part and in parallel to a surface of the cover, so that the second flexible plate part is separated from the surface of the cover by a space, and further an inside surface of the second flexible plate part facing to the space has a projection which projects into the space and toward the surface of the cover, and wherein the first engagement part comprises a plate member which further has: an opening for introducing the second flexible plate part; a guide groove connected with the opening for guiding the first flexible plate part to allow the second flexible plate part to slide on an opposite surface of the plate member to the surface of the cover; and a hole for allowing the projection provided on the second flexible plate part to snap into the hole when the first flexible plate part is guided along the guide groove and the second flexible plate part slides on the opposite surface of the plate member. The display module is supported by the line segments comprising the grooves. This structure relaxes the mechanical stress or prevents the mechanical stress concentration to points when the display module receives the external stress such as the external shock. The relaxation to the mechanical stress or prevention of the mechanical stress concentration may prevent the display module and the cover from being broken. This mounting structure does not use the screws, for which reason the above described advantages caused by no use of the screws can be obtained.

It is also preferable that a pair of the first and second engagement parts comprises an adhesive tape having opposite surfaces capable of adhering the display module and the structural member of the cover respectively. This mounting structure does not use the screws, for which reason the above described advantages caused by no use of the screws can be obtained.

It is also preferable that the first engagement part comprises a rotational module holder for holding one side face of the display module whilst the second engagement part comprises a holder supporter for mechanically and pivotally supporting the rotational module supporter so as to allow the rotational module holder to rotate around a longitudinal axis of the rotational module holder and also for fixing the rotational module holder at a predetermined angle. The display module is supported by the separate positions. This structure relaxes the mechanical stress or prevents the mechanical stress concentration to points when the display module receives the external stress such as the external shock. The relaxation to the mechanical stress or prevention of the mechanical stress concentration may prevent the display module and the cover from being broken. The rotational module holder serves as a reinforcement member to increase the mechanical strength of the display module. No need to form the engagement parts on the display module simplifies the manufacturing process, whereby the manufacturing cost can be reduced and a freedom in design of the display module can also be increased. This mounting structure does not use the screws, for which reason the above described advantages caused by no use of the screws can be obtained. This mounting structure does not use the screws, for which reason the above described advantages caused by no use of the screws can be obtained.

It is also preferable that the rotational module holder comprises a body extending along the one side face of the display module; a pair of first cylindrically shaped projections projecting outwardly from opposite side faces of the body; and a pair of second cylindrically shaped projections projecting outwardly from opposite side faces of the body, whilst the holder supporter comprises a pair of plate members confronting with the opposite side faces of the body, and the pair of the plate members also have: a pair of first circular shaped holes receiving the first cylindrically shaped projections for pivotally supporting the body of the rotational module holder and allowing the rotational module holder to rotate around the longitudinal axis of the rotational module holder; and a pair of second circular shaped holes receiving the second cylindrically shaped projections for allowing the second cylindrically shaped projections to snap into the second circular shaped holes thereby to fix the rotational module holder. The display module is supported by the separate positions. This structure relaxes the mechanical stress or prevents the mechanical stress concentration to points when the display module receives the external stress such as the external shock. The relaxation to the mechanical stress or prevention of the mechanical stress concentration may prevent the display module and the cover from being broken. This mounting structure does not use the screws, for which reason the above described advantages caused by no use of the screws can be obtained. The rotational module holder serves as a reinforcement member to increase the mechanical strength of the display module. No need to form the engagement parts on the display module simplifies the manufacturing process, whereby the manufacturing cost can be reduced and a freedom in design of the display module can also be increased. This mounting structure does not use the screws, for which reason the above described advantages caused by no use of the screws can be obtained. In this cause, it is further preferable that the second engagement part further comprises a fix module holder for holding an opposite side of the display module to the one side face of the display module. It is further more preferable that the fix module holder further has a pushing member for pushing the opposite side of the display module toward the rotational module holder in order to securely position the display module without clattering.

PREFERRED EMBODIMENT

First Embodiment

Figure 5:
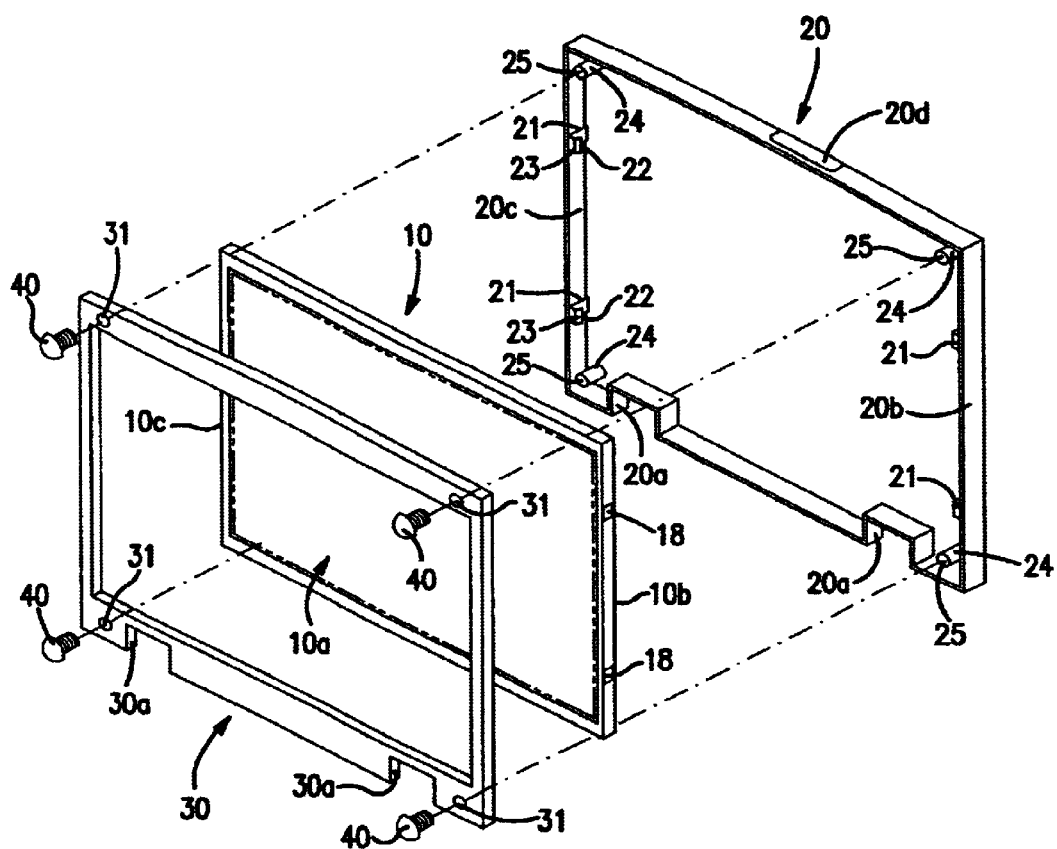
FIG. 5 is a perspective view illustrative of a liquid crystal module mounting structure for mounting a liquid crystal module to a structural frame of a cover of a personal computer in a first embodiment in accordance with the present invention.

A first embodiment according to the present invention will be described in detail with reference to the drawings. FIG. 5 is a perspective view illustrative of a liquid crystal module mounting structure for mounting a liquid crystal module to a structural frame of a cover of a personal computer in a first embodiment in accordance with the present invention. A liquid crystal module 10 is mounted to a bottom plate 20 of a cover of a personal computer. An outside frame 30 is attached to the bottom plate 20 The bottom plate 20 and the outside frame 30 are made of a plastic. The bottom plate 20 faces to the back face of the liquid crystal module 10. The liquid crystal module 10 has a display face 10a which is opposite to the back face. The liquid crystal module 10 is disposed between the bottom plate 20 and the outside frame 30 of the cover. The liquid crystal module 10 is mounted to the bottom plate 20 of the cover by the following novel liquid crystal mounting structure. The outside frame 30 is attached to the bottom plate 20 of the cover by the following attachment tools.

Figure 6:
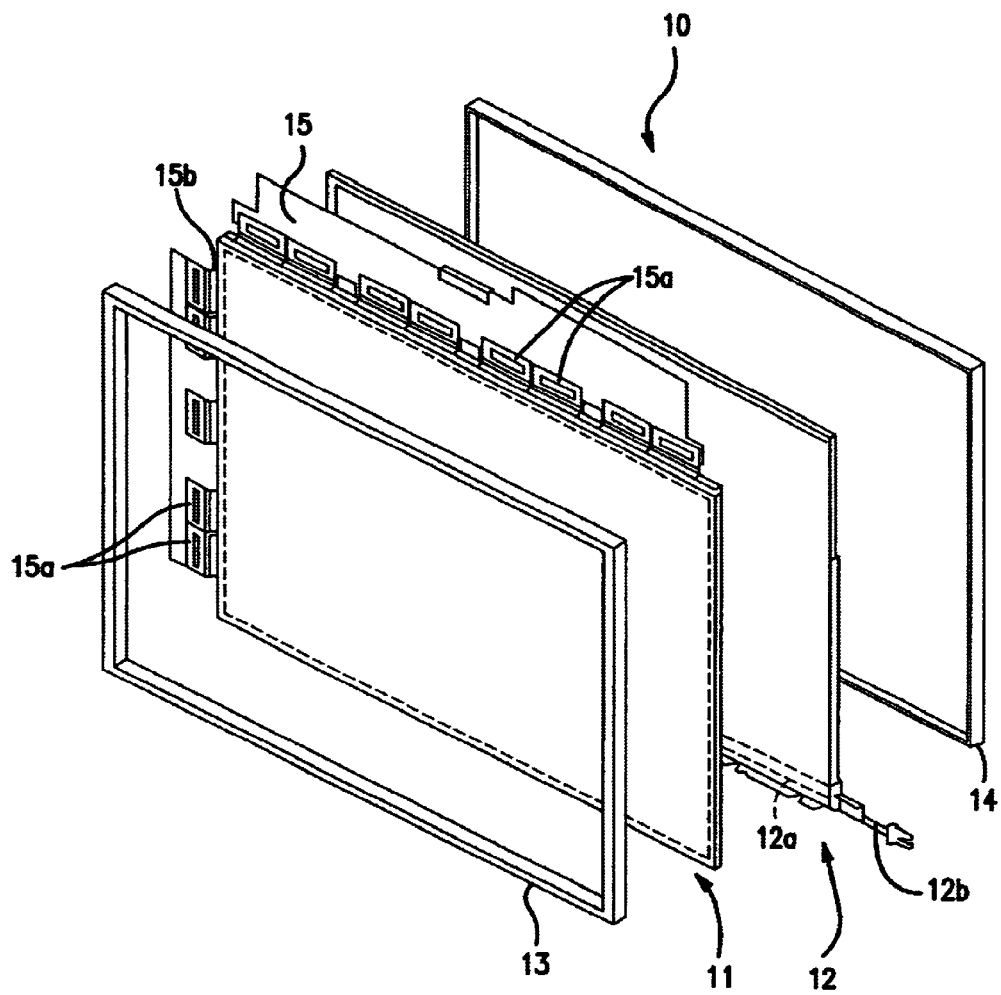
FIG. 6 is a perspective view illustrative of individual components of a liquid crystal module shown in FIG. 5.

Before descriptions of how to mount the liquid crystal module 10 to the bottom plate 20 and to attach the outside frame 30 to the bottom plate 20 of the cover, a structure of the liquid crystal module 10 is described here. FIG. 6 is a perspective view illustrative of individual components of a liquid crystal module shown in FIG. 5. The liquid crystal module 10 comprises a front frame 13, a liquid crystal display panel 11, a back-light unit 12, a back frame 14 and a printed circuit board 15. The liquid crystal display panel 11 and the back-light unit 12 are laminated to each other so that laminations of the liquid crystal display panel 11 and the back-light unit 12 are sandwiched between the front frame 13 and the back frame 14. The front frame 13 and the back frame 14 are made of a metal. The combined front and back frames 13 and 14 cover four peripheral sides of the laminations of the liquid crystal display panel 11 and the back-light unit 12. The combined front and back frames 13 and 14 increase the mechanical strength of the liquid crystal module 10. The liquid crystal display panel 11 is provided with the printed circuit board 15 having a driver IC 15a. The driver IC15a of the printed circuit board 15 is electrically connected through a flexible wiring board 15b to the liquid crystal display panel 11, so that the driver IC 15a of the printed circuit board 15 generates control signals on the basis of image data having entered from an external device and the control signals are then transmitted through the flexible wiring board 15b to the liquid crystal display panel 11, whereby the liquid crystal display panel 11 controls liquid crystal cells in accordance with the control signals.

The back-light unit 12 accommodates a fluorescent lamp 12a along its bottom side. The fluorescent lamp 12a turns on a light by a power supplied from a power terminal 12b. The fluorescent lamp 12a emits a light which propagates from the bottom side of the back-light unit 12 to the top side thereof. The back-light unit 12 also has a reflective sheet not illustrated. The light emitted from the fluorescent lamp 12a is reflected by the reflective sheet. The light is transmitted with a uniform intensity from a front face of the back-light unit 12 to the display face of the liquid crystal display panel 11, whereby images and characters are displayed on the front face of the liquid crystal display panel 11 with an incident light which has been adjusted in intensity by liquid crystal device.

For assembling the liquid crystal module 10, the flexible wiring board 15b is folded and sandwiched between the back-light unit 12 and the back frame 14 to fix the printed circuit board 15.

With reference back to FIG. 5, the liquid crystal module 10 has right and left sides, each of which is provided with two recessed portions 18 as engagement parts. The two recessed portions 18 are distanced from each other and are positioned close to the opposite comers at opposite ends of each of the right and left sides of the liquid crystal module 10. In more detail, the four recessed portions 18 may be provided on either the front or back frame 13 or 14. The bottom plate 20 has right and left rims which have inside right and left rim faces 20b and 20c. Each of the inside right and left rim faces 20b and 20c has two flexible projecting members 21 at corresponding positions to the above two recessed portions 18, so that the four flexible projecting members 21 are engaged with the four recessed portions 18. Each of the flexible projecting members 21 has a flexible crew portion 22 which projects inwardly so that the flexible crew portion 22 may snap into the recessed portion 18. Each of the flexible crew portions 22 has a guide face 23 which is sloped from inwardly, so that when the liquid crystal module 10 is made closer to the bottom plate 20, then the guide faces 23 of the flexible projecting members 21 are made into contact with and pressed with the right and left sides 10b and 10c of the liquid crystal module 10, so that the flexible projecting members 21 are made tilted and then when the recessed portions 18 come corresponding in positions to the flexible projecting members 21, the flexible projecting members 21 are made turned to the originals so that the flexible crew portions 22 are snapped into the recessed portions 18, whereby the recessed portions 18 as the first engagement parts are engaged with the flexible projecting members 21 as the second engagement parts.

The outside frame 30 is attached to the bottom plate 20 by use of four screws 40. The outside frame 30 has four screw holes 31 in the vicinity of the four corners of the outside frame 30. The bottom plate 20 has four screw receiving portions 24 in the vicinity of the four corners of the bottom plate 20 namely at the corresponding positions to the four screw holes 31, so that when the outside frame 30 comes together with the bottom plate 20, the four screw receiving portions 24 are aligned to the four screw holes 31, whereby the four screws 40 are screwed from the four screw holes 31 into the four screw receiving portions 24, in order to attach the outside frame 30 to the bottom plate 20. Each of the four screw receiving portions 24 comprises a cylindrically shaped part extending in a thickness direction of the bottom plate 20. The cylindrically shaped part has a threaded hole 25, into which the screw 40 is inserted.

Figure 7:
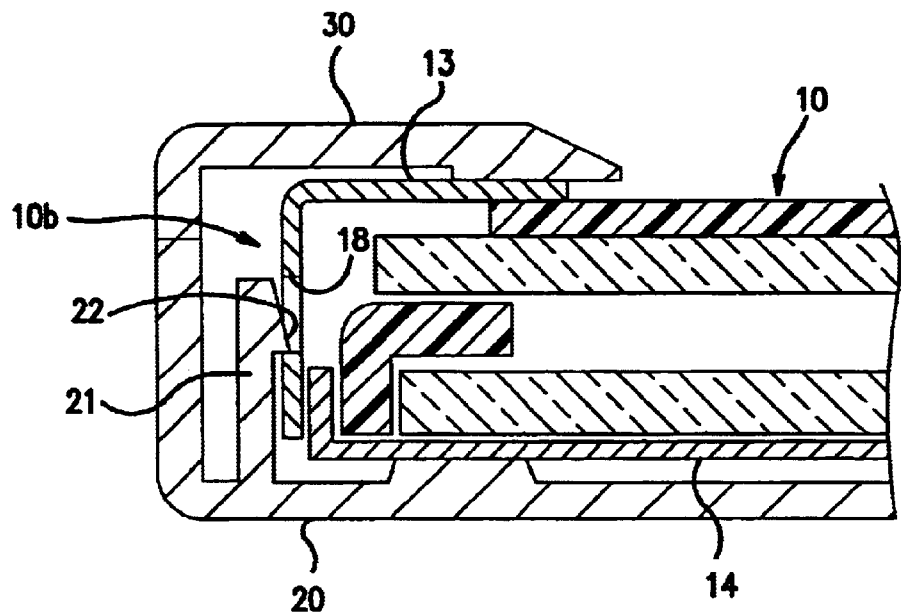
FIG. 7 is a fragmentary cross sectional elevation view illustrative of an engagement structure between the flexible projecting member provided on the bottom plate and the recessed portion provided on the liquid crystal module.

FIG. 7 is a fragmentary cross sectional elevation view illustrative of an engagement structure between the flexible projecting member provided on the bottom plate and the recessed portion provided on the liquid crystal module. As described above, the flexible crew portion 22 of the flexible projecting member 21 snaps into the recessed portion 18. Each of the flexible crew portions 22 has a guide face 23 which is sloped from inwardly, so that when the liquid crystal module 10 is made closer to the bottom plate 20, then the guide faces 23 of the flexible projecting members 21 are made into contact with and pressed with the right and left sides 10b and 10c of the liquid crystal module 10, so that the flexible projecting members 21 are made tilted and then when the recessed portions 18 come corresponding in positions to the flexible projecting members 21, the flexible projecting members 21 are made turned to the originals so that the flexible crew portions 22 are snapped into the recessed portions 18, whereby the recessed portions 18 as the first engagement parts are engaged with the flexible projecting members 21 as the second engagement parts. As a result, the liquid crystal module 10 is mounted to the bottom plate 20 by the engagements between the flexible projecting members 21 and the recessed portions 18. The outside frame 30 is further attached to the bottom plate 20 by the screws 40 so that the peripheral portion of the liquid crystal module 10 is sandwiched between the outside frame 30 and the bottom plate 20, whereby the liquid crystal module 10 is accommodated in the cover.

With reference back to FIG. 5, the bottom plate 20 has a bottom rim which has two recesses 20a which are distanced from each other. The outside frame 30 also has a bottom side which has two recesses 30a at corresponding positions to the two recesses 20a. The recesses 20a and 30a are formed for accommodations of hinge tools which hinge the cover to the body.

As described above, the liquid crystal module 10 is placed closer to the bottom frame 20 and then the liquid crystal module 10 is pushed into the bottom frame 20. When the liquid crystal module 10 is made closer to the bottom plate 20, then the guide faces 23 of the flexible projecting members 21 are made into contact with and pressed with the right and left sides 10b and 10c of the liquid crystal module 10, so that the flexible projecting members 21 are made tilted and then when the recessed portions 18 come corresponding in positions to the flexible projecting members 21, the flexible projecting members 21 are made turned to the originals so that the flexible crew portions 22 are snapped into the recessed portions 18, whereby the recessed portions 18 as the first engagement parts are engaged with the flexible projecting members 21 as the second engagement parts. As a result, the liquid crystal module 10 is mounted to the bottom plate 20 by the engagements between the flexible projecting members 21 and the recessed portions 18. The outside frame 30 is further attached to the bottom plate 20 by the screws 40 so that the peripheral portion of the liquid crystal module 10 is sandwiched between the outside frame 30 and the bottom plate 20, whereby the liquid crystal module 10 is accommodated in the cover.

In accordance with the present invention, the recessed portions 18 are provided on the side faces of the liquid crystal module 10 whilst the flexible projecting members 21 are provided on the inside faces of the right and left rims of the bottom plate 20 of the cover respectively, so that only fitting the liquid crystal module 10 into the bottom plate 20 as the structural member of the cover causes the flexible projecting members 21 to be engaged with the recessed portions 18, thereby to mount the liquid crystal module 10 to the bottom plate 20 as the structural member of the cover. This novel mounting structure for mounting the liquid crystal module 10 to the bottom plate 20 as the structural member of the cover does never need to provide a screw formation region of the conventional mounting structure described above. Namely, the novel mounting structure for mounting the liquid crystal module 10 to the bottom plate 20 as the structural member of the cover does never utilizes the screw.

Thus, the screw-free mounting structure in accordance with the present invention is free from the conventional problem in that the thickness of the liquid crystal module 10 should be decided dependent upon the screws on the basis of the necessary strength in tightly fixing the liquid crystal module 10 to the cover. Namely, the screw-free mounting structure makes it possible to reduce the thickness of the liquid crystal module 10 with keeping the necessary fixing or mounting strength.

Thus, the screw-free mounting structure in accordance with the present invention is free from the conventional problem with the conventional side mount type liquid crystal module mounting structure. No use of screws nor formations of screw holes do need no margin on the side portions for driving the screws, resulting in narrowing the width of the liquid crystal module 10. Further, no space is formed between the outside frame and the back-light portion. No space makes it possible to increase a ratio in area of a display surface to the entire part of the liquid crystal module 10, even the area of the liquid crystal module 10 is limited by the cover to which the liquid crystal module 10 is mounted.

No use of the screws further provide the following advantages. No use of the screws needs no formation of the screw hole formation portion which should have to be made of a metal material, which is heavy more than a resin of a body of the outside frame. No use of the metal material for the outside frame results in reduction in weight of the mobile terminal.

Further, no use of the screw results in no screw hole formation portion extending in a thickness direction of the liquid crystal module 10. No screw hole formation portion does not need any margins. No margins make it possible to further reduce the thickness of the liquid crystal module.

No formation of any screw formation portion makes the mobile terminal free from the conventional problem with limitation in laying out the driver IC. This means that a freedom in design of signal lines of the driver IC is increased. No formation of the screw formation region makes it possible to obtain an optimum layout of the signal lines of the driver IC.

As described above, no use of metal material further provides an advantage in being free from the conventional problem with a possible generation of a metal broken piece, which may form a short circuit on an electronic circuit.

No use of the screws nor formation of the screw formation regions further provide an advantage in being free from the conventional problem in that if the mobile terminal mounted with the side mount liquid crystal module receives an external shock, then a mechanical stress due to the received shock is concentrated to the screw formation region. No use of the screws nor formation of the screw formation regions makes the liquid crystal panel and the outside frame free from damages due to the mechanical stress due to the received shock.

The cover of the mobile terminal has no screw receiving portion for receiving the screw, for which reason a slide mold is not necessary to form the cover. This means that the cost for forming the manufacturing line may be reduced.

The above novel mounting structure of the liquid crystal module 10 is convenient in removing the liquid crystal module 10 from the cover because the recessed portions 18 provided on the side faces of the liquid crystal module 10 and the flexible projecting members 21 provided on the bottom plate 20 as the structural frame of the cover are engaged with each other by only a single operation of fitting the liquid crystal module 10 into the bottom plate 20 as the structural frame of the cover.

No use of the screws means no formation of the screw receiving portions, for which reason the screw hole formation region is required to have a high strength by use of a high strength metal such as Mg allow which is, however, expensive and heavy and has a low formability.

Figure 8A:
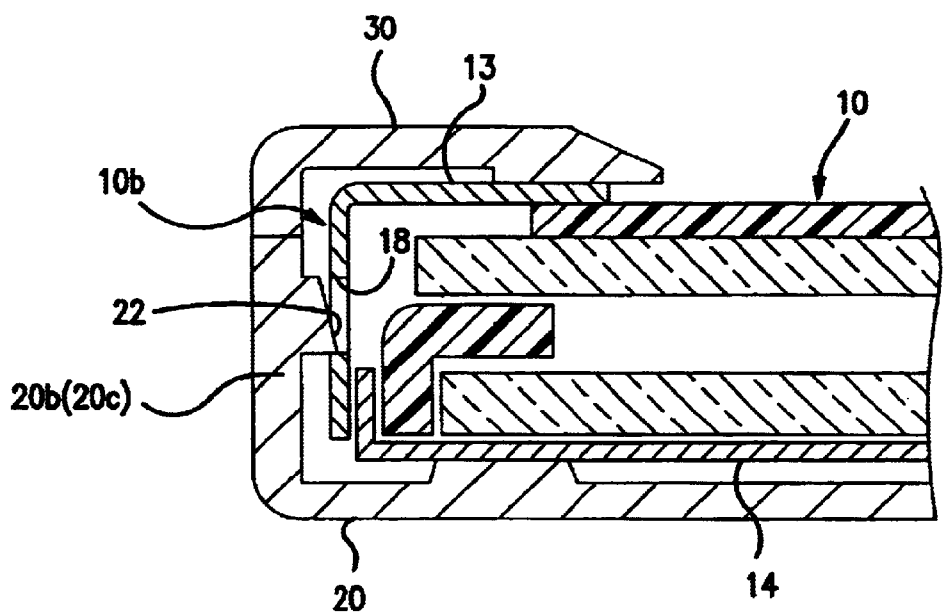
FIG. 8A is a fragmentary cross sectional elevation view illustrative of a modified engagement structure between the flexible projecting member provided on the bottom plate and the recessed portion provided on the liquid crystal module.

The engagement structure shown in FIG. 7 may be modified as follows. FIG. 8A is a fragmentary cross sectional elevation view illustrative of a modified engagement structure between the flexible projecting member provided on the bottom plate and the recessed portion provided on the liquid crystal module. In place of the flexible projecting members 21 with the crew portions 22, the crew portions 22 are directly formed on the inside faces of the right and left rims of the bottom plate 20 at corresponding positions to the recessed portions 18 so that when the liquid crystal module 10 is fitted to the bottom plate 20, then the crew portions 22 are inserted into the recessed portions 18. No provision of the flexible projecting members 21 reduces the space between the side portions of the liquid crystal module 10 and the side portions of the cover.

Figure 8B:
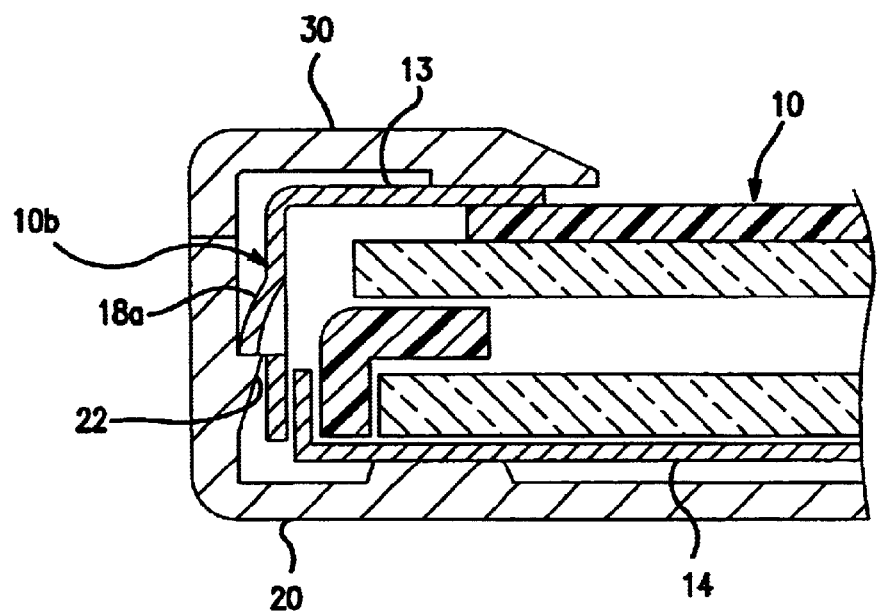
FIG. 8B is a fragmentary cross sectional elevation view illustrative of another modified engagement structure between the flexible projecting member provided on the bottom plate and the recessed portion provided on the liquid crystal module.

The engagement structure may also be modified as follows. FIG. 8B is a fragmentary cross sectional elevation view illustrative of another modified engagement structure between the flexible projecting member provided on the bottom plate and the recessed portion provided on the liquid crystal module. In place of the recessed portions 18, crews 18*a* are provided which extend from the side faces 10*b* of the liquid crystal module 10. The crews 18*a* comprise outwardly projecting bent portions extending from the side faces 10*b* of the liquid crystal module 10. Further, in place of the flexible projecting members 21 with the crew portions 22, the crew portions 22 are directly formed on the inside faces of the right and left rims of the bottom plate 20 so that when the liquid crystal module 10 is fitted to the bottom plate 20, then the crew portions 22 are engaged with the crews 18*a* as shown in FIG. 8B. No provision of the flexible projecting members 21 reduces the space between the side portions of the liquid crystal module 10 and the side portions of the cover.

In this embodiment, the recessed portions 18 are provided on the right and left side faces of the liquid crystal module 10 whilst the flexible projecting members 21 are provided on the inside faces of the right and left rim portions of the bottom plate 20 of the cover. As a further modification, it is possible that the recessed portions 18 are provided on the top and bottom side faces of the liquid crystal module 10 whilst the flexible projecting members 21 are provided on the inside faces of the top and bottom rim portions of the bottom plate 20 of the cover.

In this embodiment, the flexible projecting members 21 are provided on the inside faces of the right and left rim portions of the bottom plate 20 of the cover. As a still further modification, it is possible that the flexible projecting members 21 are provided on the inside faces of the right and left rim portions of the outside frame 30.

In this embodiment, the recessed portions 18 are provided on the right and left side faces of the liquid crystal module 10 whilst the flexible projecting members 21 are provided on the inside faces of the right and left rim portions of the bottom plate 20 of the cover. As a further more modification, it is possible that the flexible projecting members 21 are provided on the top and bottom side faces of the liquid crystal module 10 whilst the recessed portions 18 are provided on the inside faces of the top and bottom rim portions of the bottom plate 20 of the cover.

In this embodiment, the recessed portions 18 are provided on the right and left side faces of the liquid crystal module 10 whilst the flexible projecting members 21 are provided on the inside faces of the right and left rim portions of the bottom plate 20 of the cover. As moreover modification, it is possible that the flexible projecting members 21 are provided on the top and bottom side faces of the liquid crystal module 10 whilst the recessed portions 18 are provided on the inside faces of the top and bottom rim portions of the outside frame 30 of the cover.

In this embodiment, the recessed portions 18 are provided on the right and left side faces of the liquid crystal module 10 whilst the flexible projecting members 21 are provided on the inside faces of the right and left rim portions of the bottom plate 20 of the cover. As a still further modification, it is possible that the flexible projecting members 21 are provided on the inside faces of the top and bottom rim portions of the outside frame 30, whilst the recessed portions 18 are provided on the top and bottom side faces of the liquid crystal module 10.

Second Embodiment

Figure 9:
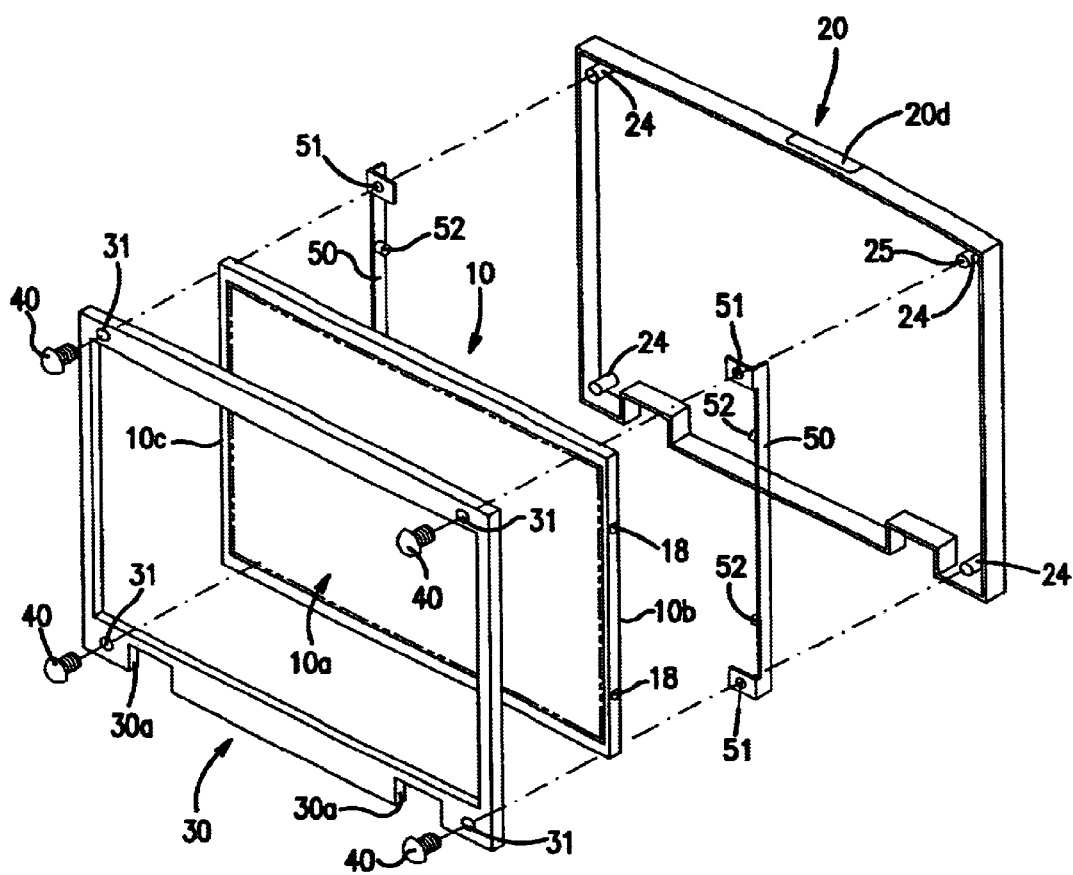
FIG. 9 is a perspective view illustrative of a liquid crystal module mounting structure for mounting a liquid crystal module to a structural frame of a cover of a personal computer in a second embodiment in accordance with the present invention.

A second embodiment according to the present invention will be described in detail with reference to the drawings. FIG. 9 is a perspective view illustrative of a liquid crystal module mounting structure for mounting a liquid crystal module to a structural frame of a cover of a personal computer in a second embodiment in accordance with the present invention. In this embodiment, a pair of right and left metal reinforcement members 50 are provided both for increasing the mechanical strength of the cover accommodating the liquid crystal module 10 and for mounting the liquid crystal module 10

A liquid crystal module 10 is mounted to a pair of right and left metal reinforcement members 50. The right and left metal reinforcement members 50 are attached to a bottom plate 20 of a cover of a personal computer. An outside frame 30 is attached through the right and left metal reinforcement members 50 to the bottom plate 20. The bottom plate 20 and the outside frame 30 are made of a plastic. The right and left metal reinforcement members 50 are made of a metal. The bottom plate 20 faces to the back face of the liquid crystal module 10. The liquid crystal module 10 has a display face 10*a* which is opposite to the back face. The liquid crystal module 10 is disposed between the bottom plate 20 and the outside frame 30 of the cover. The liquid crystal module 10 is mounted to the right and left metal reinforcement members 50 by the following novel liquid crystal mounting structure. The outside frame 30 is attached through the right and left metal reinforcement members 50 to the bottom plate 20 of the cover by the following attachment tools.

The structure of the liquid crystal module 10 is the same as in the first embodiment and shown in FIG. 6, for which reason descriptions of the structure of the liquid crystal module 10 will be omitted to prevent the exactly duplicate descriptions.

The liquid crystal module 10 has right and left sides, each of which is provided with two recessed portions 18 as engagement parts. The two recessed portions 18 are distanced from each other and are positioned close to the opposite corners at opposite ends of each of the right and left sides of the liquid crystal module 10. The right and left metal reinforcement members 50 have inside faces, each of which has two convex portions 52 at corresponding positions to the above two recessed portions 18, so that the four convex portions 52 are engaged with the four recessed portions 18. The right and left metal reinforcement members 50 are attached to the bottom plate 20, so that the right and left metal reinforcement members 50 extend along the right and left rim portions of the bottom plate 20, whereby when the liquid crystal module 10 is fitted to the bottom plate 20, the right and left side faces 10*b* and 10*c* of the liquid crystal module 10 come together with the inside faces of the right and left metal reinforcement members 50. As a result, the convex portions 52 formed on the inside faces of the right and left metal reinforcement members 50 are snapped into the recessed portions 18 formed on the right and left side faces 10*b* and 10*c* of the liquid crystal module 10.

The outside frame 30 is attached through the right and left metal reinforcement members 50 to the bottom plate 20 by use of four screws 40. The outside frame 30 has four screw holes 31 in the vicinity of the four corners of the outside frame 30. Each of the right and left metal reinforcement members 50 has two screw holes 51 at its opposite ends which correspond in position to the screw holes 31 of the outside frame 30. The bottom plate 20 has four screw receiving portions 24 in the vicinity of the four corners of the bottom plate 20 namely at the corresponding positions to the four screw holes 31 and also to the screw holes 51 of the right and left metal reinforcement members 50, so that when the outside frame 30 comes together with the right and left metal reinforcement members 50 and the bottom plate 20, the four screw receiving portions 24 are aligned to the four screw holes 51 of the right and left metal reinforcement members 50 and the four screw holes 31 of the outside frame 30, whereby the four screws 40 are screwed from the four screw holes 31 and the four screw holes 51 into the four screw receiving portions 24, in order to attach the outside frame 30 via the right and left metal reinforcement members 50 to the bottom plate 20. Each of the four screw receiving portions 24 comprises a cylindrically shaped part extending in a thickness direction of the bottom plate 20. The cylindrically shaped part has a threaded hole 25, into which the screw 40 is inserted.

Figure 10:
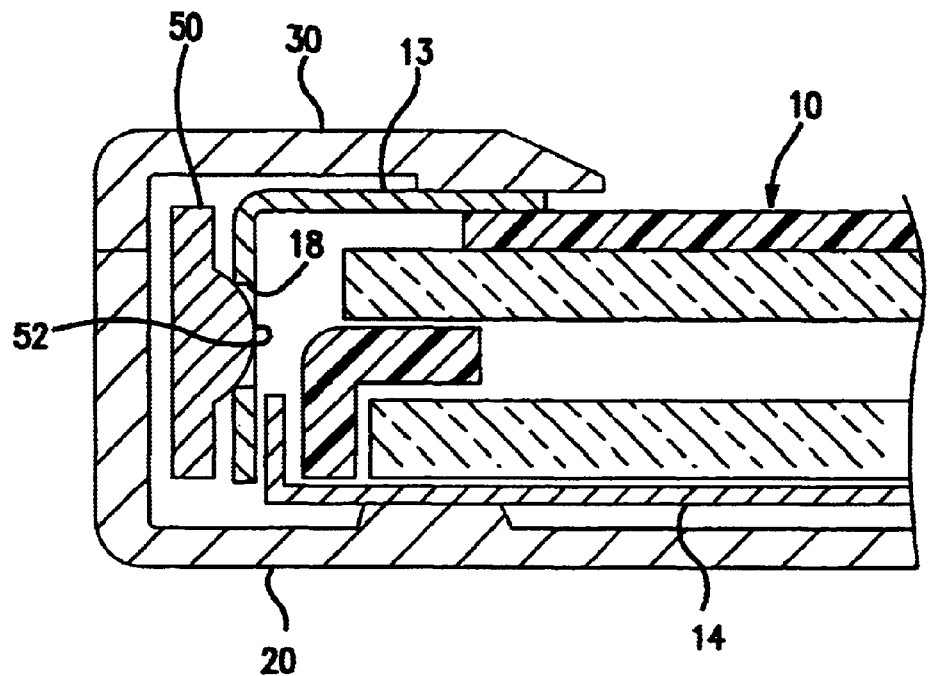
FIG. 10 is a fragmentary cross sectional elevation view illustrative of an engagement structure between the convex portion provided on the right and left metal reinforcement members and the recessed portion provided on the liquid crystal module.

FIG. 10 is a fragmentary cross sectional elevation view illustrative of an engagement structure between the convex portion provided on the right and left metal reinforcement members and the recessed portion provided on the liquid crystal module. As described above, when the recessed portions 18 come corresponding in positions to the convex portions 52, the convex portions 52 are snapped into the recessed portions 18, whereby the recessed portions 18 as the first engagement parts are engaged with the convex portions 52 as the second engagement parts. As a result, the liquid crystal module 10 is mounted to the bottom plate 20 by the engagements between the convex portions 52 and the recessed portions 18. The outside frame 30 is further attached to the bottom plate 20 by the screws 40 so that the peripheral portion of the liquid crystal module 10 is sandwiched between the outside frame 30 and the bottom plate 20, whereby the liquid crystal module 10 is accommodated in the cover.

With reference back to FIG. 9, the bottom plate 20 has a bottom rim which has two recesses 20a which are distanced from each other. The outside frame 30 also has a bottom side which has two recesses 30a at corresponding positions to the two recesses 20a. The recesses 20a and 30a are formed for accommodations of hinge tools which hinge the cover to the body.

As described above, the liquid crystal module 10 is placed closer to the bottom frame 20 and then the liquid crystal module 10 is pushed into the bottom frame 20. When the recessed portions 18 come corresponding in positions to the convex portions 52 of the right and left metal reinforcement members 50, the convex portions 52 of the right and left metal reinforcement members 50 are snapped into the recessed portions 18, whereby the recessed portions 18 as the first engagement parts are engaged with the convex portions 52 as the second engagement parts. As a result, the liquid crystal module 10 is mounted to the bottom plate 20 by the engagements between the convex portions 52 and the recessed portions 18. The outside frame 30 is further attached through the right and left metal reinforcement members 50 to the bottom plate 20 by the screws 40 so that the peripheral portion of the liquid crystal module 10 is sandwiched between the outside frame 30 and the bottom plate 20 and also held between the of the right and left metal reinforcement members 50, whereby the liquid crystal module 10 is accommodated in the cover. The right and left metal reinforcement members 50 increases the mechanical strength of the cover accommodating the liquid crystal module 10 and the liquid crystal module 10 is mounted through the right and left metal reinforcement members 50 to the bottom plate 20 of the cover.

In accordance with the present invention, the right and left metal reinforcement members 50 are provided for increasing the mechanical strength of the cover accommodating the liquid crystal module 10 and also for allowing the liquid crystal module 10 to be mounted through the right and left metal reinforcement members 50 to the bottom plate 20 of the cover.

The provision of the right and left metal reinforcement members 50 which increase the mechanical strength allows a reduction of the mechanical strengths of the bottom plate 20 and the outside frame 30. This means it possible to reduce the weights of the bottom plate 20 and the outside frame 30, whereby the weight of the cover can be reduced.

The convex portions 52 are provided on the right and left metal reinforcement members 50. Namely, the right and left metal reinforcement members 50 with the convex portions 52 are formed. The right and left metal reinforcement members 50 with the convex portions 52 are attached to the bottom plate 20, for which reason the bottom plate 20 made of the plastic is free of any engagement portions for allowing the liquid crystal module 10 to be mounted to the bottom plate 20, whereby the number of the necessary molding processes for forming the bottom plate 20 made of the plastic can be reduced. The reduction in the number of the necessary molding processes for forming the bottom plate 20 allows a reduction of the manufacturing cost. Further, the bottom plate 20 may be common to various changes in positions and sizes of the recessed portions 18 provided on the liquid crystal module 10, because the convex portions 52 provided on the right and left metal reinforcement members 50 are adjusted to the changes in positions and sizes of the recessed portions 18. This can respond to the requirement for various changes in design with keeping the reduction in the manufacturing cost.

The recessed portions 18 are provided on the side faces of the liquid crystal module 10 whilst the convex portions 52 are provided on the inside faces of the right and left metal reinforcement members 50 which are attached to the right and left rims of the bottom plate 20 of the cover respectively, so that only fitting the liquid crystal module 10 into the right and left metal reinforcement members 50 causes the convex portions 52 to be engaged with the recessed portions 18, thereby to mount the liquid crystal module 10 through the right and left metal reinforcement members 50 to the bottom plate 20 as the structural member of the cover. This novel mounting structure for mounting the liquid crystal module 10 to the bottom plate 20 as the structural member of the cover does never need to provide a screw formation region of the conventional mounting structure described above. Namely, the novel mounting structure for mounting the liquid crystal module 10 to the bottom plate 20 as the structural member of the cover does never utilizes the screw.

Thus, the screw-free mounting structure in accordance with the present invention is free from the conventional problem in that the thickness of the liquid crystal module 10 should be decided dependent upon the screws on the basis of the necessary strength in tightly fixing the liquid crystal module 10 to the cover. Namely, the screw-free mounting structure makes it possible to reduce the thickness of the liquid crystal module 10 with keeping the necessary fixing or mounting strength.

Thus, the screw-free mounting structure in accordance with the present invention is free from the conventional problem with the conventional side mount type liquid crystal module mounting structure. No use of screws nor formations of screw holes do need no margin on the side portions for driving the screws, resulting in narrowing the width of the liquid crystal module 10. Further, no space is formed between the outside frame and the back-light portion. No space makes it possible to increase a ratio in area of a display surface to the entire part of the liquid crystal module 10, even the area of the liquid crystal module 10 is limited by the cover to which the liquid crystal module 10 is mounted.

Further, no use of the screw results in no screw hole formation portion extending in a thickness direction of the liquid crystal module 10. No screw hole formation portion does not need any margins. No margins make it possible to further reduce the thickness of the liquid crystal module.

No formation of any screw formation portion makes the mobile terminal free from the conventional problem with limitation in laying out the driver IC. This means that a freedom in design of signal lines of the driver IC is increased. No formation of the screw formation region makes it possible to obtain an optimum layout of the signal lines of the driver IC.

As described above, no use of metal material further provides an advantage in being free from the conventional problem with a possible generation of a metal broken piece, which may form a short circuit on an electronic circuit.

No use of the screws nor formation of the screw formation regions further provide an advantage in being free from the conventional problem in that if the mobile terminal mounted with the side mount liquid crystal module receives an external shock, then a mechanical stress due to the received shock is concentrated to the screw formation region. No use of the screws nor formation of the screw formation regions makes the liquid crystal panel and the outside frame free from damages due to the mechanical stress due to the received shock.

The cover of the mobile terminal has no screw receiving portion for receiving the screw, for which reason a slide mold is not necessary to form the cover. This means that the cost for forming the manufacturing line may be reduced.

The above novel mounting structure of the liquid crystal module 10 is convenient in removing the liquid crystal module 10 from the cover because the recessed portions 18 provided on the side faces of the liquid crystal module 10 and the convex portions 52 provided on the right and left metal reinforcement members 50 as the structural frame of the cover are engaged with each other by only a single operation of fitting the liquid crystal module 10 into the bottom plate 20 as the structural frame of the cover.

No use of the screws means no formation of the screw receiving portions, for which reason the screw hole formation region is required to have a high strength by use of a high strength metal such as Mg allow which is, however, expensive and heavy and has a low formability.

Figure 11:
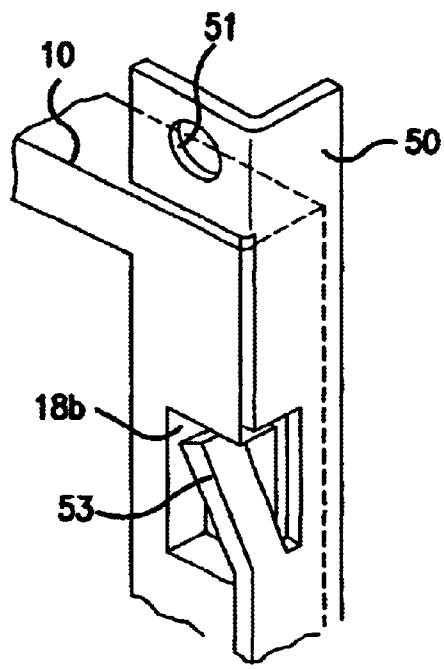
FIG. 11 is a fragmentary cross sectional elevation view illustrative of a modified engagement structure between the convex portion provided on the bottom plate and the recessed portion provided on the liquid crystal module.

The engagement structure shown in FIG. 10 may be modified as follows. FIG. 11 is a fragmentary cross sectional elevation view illustrative of a modified engagement structure between the convex portion provided on the bottom plate and the recessed portion provided on the liquid crystal module. In place of the convex portions 52, the tongue portions 53 are directly formed on the right and left metal reinforcement members 50 at corresponding positions to the recessed portions 18b so that when the liquid crystal module 10 is fitted to the right and left metal reinforcement members 50, then the tongue portions 53 are caulked to be inserted into the recessed portions 18b. No provision of the convex portions 52 reduces the space between the side portions of the liquid crystal module 10 and the side portions of the cover.

In this embodiment, the recessed portions 18 are provided on the right and left side faces of the liquid crystal module 10 whilst the convex portions 52 are provided on the right and left metal reinforcement members 50 attached to the bottom plate 20 of the cover. As a further modification, it is possible that the recessed portions 18 are provided on the top and bottom side faces of the liquid crystal module 10 whilst the convex portions 52 are provided on top and bottom metal reinforcement members attached to the bottom plate 20 of the cover.

In this embodiment, the recessed portions 18 are provided on the right and left side faces of the liquid crystal module 10 whilst the convex portions 52 are provided on the right and left metal reinforcement members 50 attached to the bottom plate 20 of the cover. As a further modification, it is possible that the convex portions 52 are provided on the top and bottom side faces of the liquid crystal module 10 whilst the recessed portions 18 are provided on the right and left metal reinforcement members 50 attached to the bottom plate 20 of the cover.

In this embodiment, the recessed portions 18 are provided on the right and left side faces of the liquid crystal module 10 whilst the convex portions 52 are provided on the right and left metal reinforcement members 50 attached to the bottom plate 20 of the cover. As a still further modification, it is possible that the convex portions 52 are provided on the top and bottom side faces of the liquid crystal module 10 whilst the recessed portions 18 are provided on top and bottom metal reinforcement members attached to the bottom plate 20 of the cover.

Third Embodiment

Figure 12:
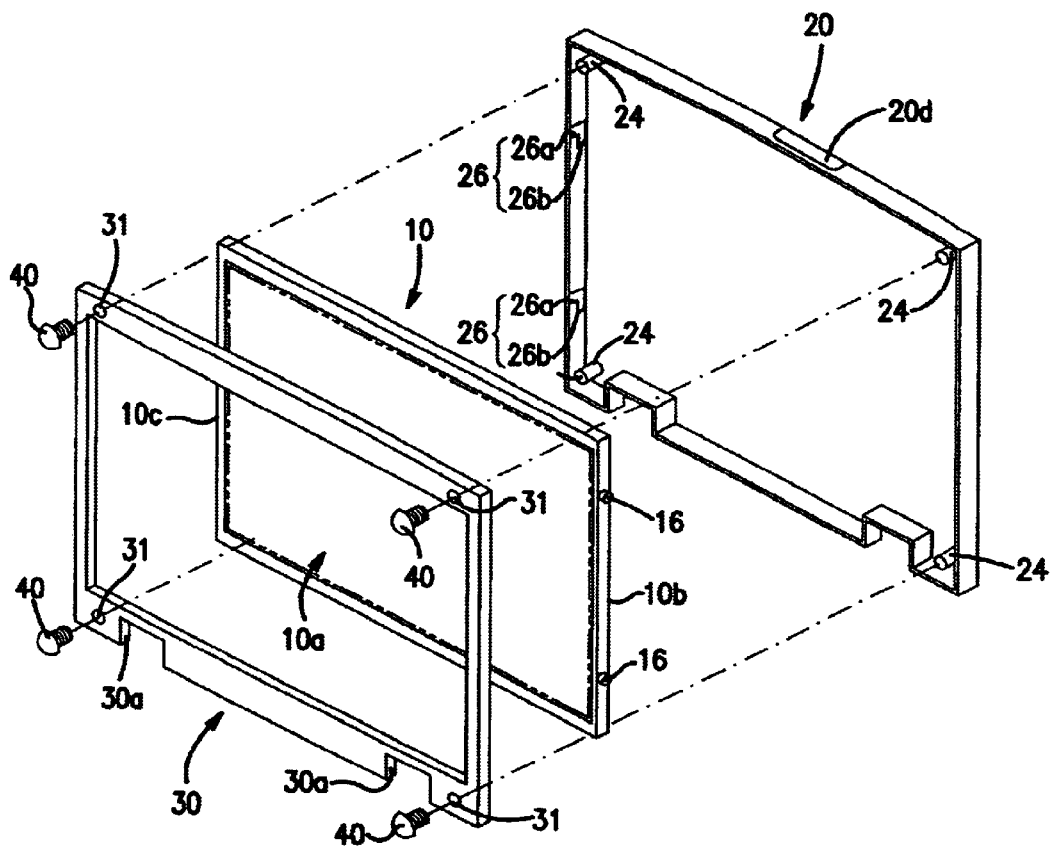
FIG. 12 is a perspective view illustrative of a liquid crystal module mounting structure for mounting a liquid crystal module to a structural frame of a cover of a personal computer in a third embodiment in accordance with the present invention.

A third embodiment according to the present invention will be described in detail with reference to the drawings. FIG. 12 is a perspective view illustrative of a liquid crystal module mounting structure for mounting a liquid crystal module to a structural frame of a cover of a personal computer in a third embodiment in accordance with the present invention. A liquid crystal module 10 is mounted to a bottom plate 20 of a cover of a personal computer. An outside frame 30 is attached to the bottom plate 20. The bottom plate 20 and the outside frame 30 are made of a plastic. The bottom plate 20 faces to the back face of the liquid crystal module 10. The liquid crystal module 10 has a display face 10a which is opposite to the back face. The liquid crystal module 10 is disposed between the bottom plate 20 and the outside frame 30 of the cover. The liquid crystal module 10 is mounted to the bottom plate 20 of the cover by the following novel liquid crystal mounting structure. The outside frame 30 is attached to the bottom plate 20 of the cover by the following attachment tools.

The structure of the liquid crystal module 10 is the same as in the first embodiment and as shown in FIG. 6, for which reason the descriptions with reference to FIG. 6 will be omitted to prevent the duplicate descriptions.

The liquid crystal module 10 has right and left sides, each of which is provided with two projecting portions 16 as engagement parts. The two projecting portions 16 are distanced from each other and are positioned close to the opposite corners at opposite ends of each of the right and left sides of the liquid crystal module 10. In more detail, the four projecting portions 16 may be provided on either the front or back frame 13 or 14. The bottom plate 20 has right and left rims which have inside right and left rim faces 20b and 20c. Each of the inside right and left rim faces 20b and 20c has two guide grooves 26 at corresponding positions to the above two projecting portions 16, so that the four guide grooves 26 are engaged with the four projecting portions 16. Each of the guide grooves 26 comprises a first guide groove portion 26a and a second guide groove portion 26b connected with the first guide groove portion 26a. The first guide groove portion 26a extends in the thickness direction of the bottom plate 20. The second guide groove portion 26b extends in a longitudinal direction of the right and left rim portions of the bottom plate 20. Namely, the second guide groove portion 26b extends perpendicular to the first guide groove portion 26a, so as to form a L-shape of the guide groove 26. When the liquid crystal module 10 is pushed into the bottom plate 20, then the projecting portions 16 are inserted through the first guide groove portion 26a of the guide groove 26. Further the liquid crystal module 10 slides onto the bottom plate 20, so that the projecting portions 16 are moved along the second guide groove portion 26b of the guide groove 26 until the projecting portions 16 are made into contact with the ends of the second guide groove portion 26b of the guide groove 26, whereby the projecting portions 16 are engaged with the guide groove 26.

The outside frame 30 is attached to the bottom plate 20 by use of four screws 40. The outside frame 30 has four screw holes 31 in the vicinity of the four corners of the outside frame 30. The bottom plate 20 has four screw receiving portions 24 in the vicinity of the four corners of the bottom plate 20 namely at the corresponding positions to the four screw holes 31, so that when the outside frame 30 comes together with the bottom plate 20, the four screw receiving portions 24 are aligned to the four screw holes 31, whereby the four screws 40 are screwed from the four screw holes 31 into the four screw receiving portions 24, in order to attach the outside frame 30 to the bottom plate 20. Each of the four screw receiving portions 24 comprises a cylindrically shaped part extending in a thickness direction of the bottom plate 20. The cylindrically shaped part has a threaded hole 25, into which the screw 40 is inserted.

The bottom plate 20 has a bottom rim which has two recesses 20a which are distanced from each other. The outside frame 30 also has a bottom side which has two recesses 30a at corresponding positions to the two recesses 20a. The recesses 20a and 30a are formed for accommodations of hinge tools which hinge the cover to the body.

As described above, the liquid crystal module 10 is placed closer to the bottom frame 20 and then the liquid crystal module 10 is pushed into the bottom frame 20. When the liquid crystal module 10 is made closer to the bottom plate 20, then the projecting portions 16 of the liquid crystal module 10 are inserted through the first guide groove portion 26a of the guide groove 26. Further the liquid crystal module 10 slides onto the bottom plate 20, so that the projecting portions 16 are moved along the second guide groove portion 26b of the guide groove 26 until the projecting portions 16 are made into contact with the ends of the second guide groove portion 26b of the guide groove 26, whereby the projecting portions 16 are engaged with the guide groove 26. As a result, the liquid crystal module 10 is mounted to the bottom plate 20 by the engagements between the guide grooves 26 and the projecting portions 16. The outside frame 30 is further attached to the bottom plate 20 by the screws 40 so that the peripheral portion of the liquid crystal module 10 is sandwiched between the outside frame 30 and the bottom plate 20, whereby the liquid crystal module 10 is accommodated in the cover.

In accordance with the present invention, the projecting portions 16 are provided on the side faces of the liquid crystal module 10 whilst the guide grooves 26 are provided on the inside faces of the right and left rims of the bottom plate 20 of the cover respectively, so that only fitting the liquid crystal module 10 into the bottom plate 20 as the structural member of the cover causes the guide grooves 26 to be engaged with the projecting portions 16, thereby to mount the liquid crystal module 10 to the bottom plate 20 as the structural member of the cover. This novel mounting structure for mounting the liquid crystal module 10 to the bottom plate 20 as the structural member of the cover does never need to provide a screw formation region of the conventional mounting structure described above. Namely, the novel mounting structure for mounting the liquid crystal module 10 to the bottom plate 20 as the structural member of the cover does never utilizes the screw.

Thus, the screw-free mounting structure in accordance with the present invention is free from the conventional problem in that the thickness of the liquid crystal module 10 should be decided dependent upon the screws on the basis of the necessary strength in tightly fixing the liquid crystal module 10 to the cover. Namely, the screw-free mounting structure makes it possible to reduce the thickness of the liquid crystal module 10 with keeping the necessary fixing or mounting strength.

Thus, the screw-free mounting structure in accordance with the present invention is free from the conventional problem with the conventional side mount type liquid crystal module mounting structure. No use of screws nor formations of screw holes do need no margin on the side portions for driving the screws, resulting in narrowing the width of the liquid crystal module 10. Further, no space is formed between the outside frame and the back-light portion. No space makes it possible to increase a ratio in area of a display surface to the entire part of the liquid crystal module 10, even the area of the liquid crystal module 10 is limited by the cover to which the liquid crystal module 10 is mounted.

No use of the screws further provide the following advantages. No use of the screws needs no formation of the screw hole formation portion which should have to be made of a metal material, which is heavy more than a resin of a body of the outside frame. No use of the metal material for the outside frame results in reduction in weight of the mobile terminal.

Further, no use of the screw results in no screw hole formation portion extending in a thickness direction of the liquid crystal module 10. No screw hole formation portion does not need any margins. No margins make it possible to further reduce the thickness of the liquid crystal module.

No formation of any screw formation portion makes the mobile terminal free from the conventional problem with limitation in laying out the driver IC. This means that a freedom in design of signal lines of the driver IC is increased. No formation of the screw formation region makes it possible to obtain an optimum layout of the signal lines of the driver IC.

As described above, no use of metal material further provides an advantage in being free from the conventional problem with a possible generation of a metal broken piece, which may form a short circuit on an electronic circuit.

No use of the screws nor formation of the screw formation regions further provide an advantage in being free from the conventional problem in that if the mobile terminal mounted with the side mount liquid crystal module receives an external shock, then a mechanical stress due to the received shock is concentrated to the screw formation region. No use of the screws nor formation of the screw formation regions makes the liquid crystal panel and the outside frame free from damages due to the mechanical stress due to the received shock.

The cover of the mobile terminal has no screw receiving portion for receiving the screw, for which reason a slide mold is not necessary to form the cover. This means that the cost for forming the manufacturing line may be reduced.

The above novel mounting structure of the liquid crystal module 10 is convenient in removing the liquid crystal module 10 from the cover because the projecting portions 16 provided on the side faces of the liquid crystal module 10 and the guide grooves 26 provided on the bottom plate 20 as the structural frame of the cover are engaged with each other by only operations of fitting the liquid crystal module 10 into the bottom plate 20 as the structural frame of the cover and subsequent motion of the liquid crystal module 10 to slide onto the bottom plate 20.

No use of the screws means no formation of the screw receiving portions, for which reason the screw hole formation region is required to have a high strength by use of a high strength metal such as Mg allow which is, however, expensive and heavy and has a low formability.

Figure 13:
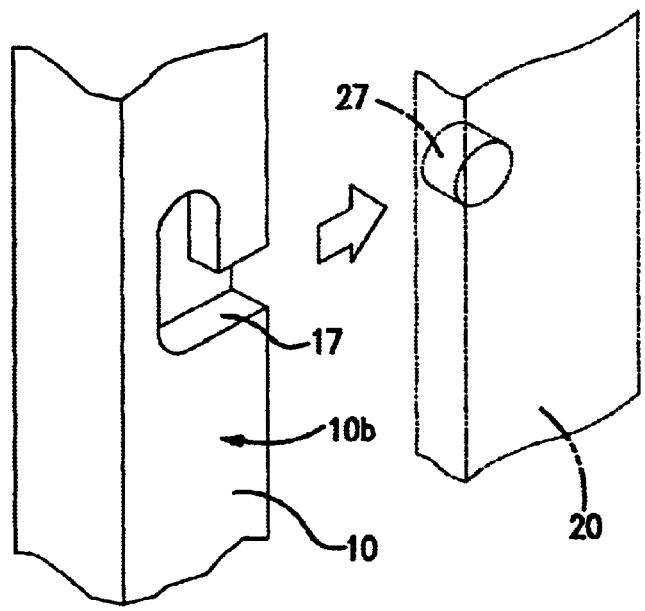
FIG. 13 is a fragmentary cross sectional elevation view illustrative of a modified engagement structure between the projecting portions provided on the bottom plate and the guide grooves provided on the liquid crystal module.

The engagement structure shown in FIG. 12 may be modified as follows. FIG. 13 is a fragmentary cross sectional elevation view illustrative of a modified engagement structure between the projecting portions provided on the bottom plate and the guide grooves provided on the liquid crystal module. The liquid crystal module 10 has right and left sides, each of which is provided with two guide grooves 17 as engagement parts. The two guide grooves 17 are distanced from each other and are positioned close to the opposite corners at opposite ends of each of the right and left sides of the liquid crystal module 10. Each of the guide grooves 17 is L-shaped which comprises a first guide groove portion and a second guide groove portion connected with the first guide groove portion. The first guide groove portion of the guide groove 17 extends in the thickness direction of the liquid crystal module 10. The second guide groove portion of the guide groove 17 extends in the longitudinal direction of the right and left sides of the liquid crystal module 10. Namely, the second guide groove portion of the guide groove 17 extends perpendicular to the first guide groove portion of the guide groove 17 to form the L-shape of the guide groove 17. The bottom plate 20 has right and left rims which have inside right and left rim faces 20b and 20c. Each of the inside right and left rim faces 20b and 20c has two projecting portions 27 at corresponding positions to the above two guide grooves 26, so that the four projecting portions 27 are engaged into the four guide grooves 26. When the liquid crystal module 10 is pushed into the bottom plate 20, then the first guide groove portions of the guide grooves 17 of the liquid crystal module 10 receive the projecting portions 27 of the bottom plate 20. Further the liquid crystal module 10 slides onto the bottom plate 20, so that the projecting portions 27 of the bottom plate 20 are moved along the second guide groove portion of the guide groove 17 of the liquid crystal module 10 until the projecting portions 27 of the bottom plate 20 are made into contact with the ends of the second guide groove portion of the guide groove 17, whereby the projecting portions 27 of the bottom plate 20 are engaged with the guide grooves 17 of the liquid crystal module 10.

Figure 14:
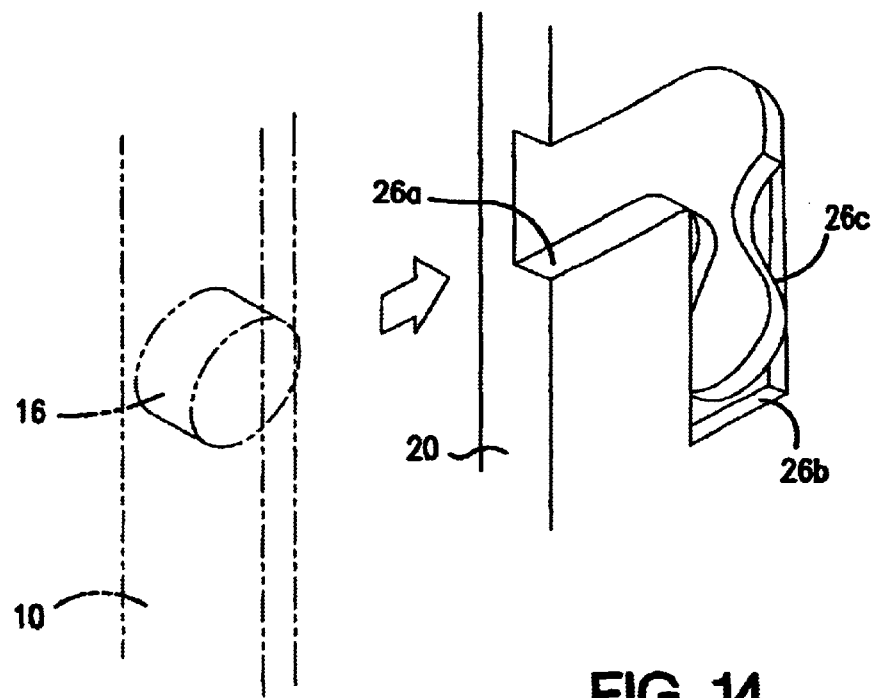
FIG. 14 is a fragmentary cross sectional elevation view illustrative of another modified engagement structure between the projecting portions provided on the liquid crystal module and the guide grooves provided on the bottom plate.

The engagement structure shown in FIG. 12 may further be modified as follows. FIG. 14 is a fragmentary cross sectional elevation view illustrative of another modified engagement structure between the projecting portions provided on the liquid crystal module and the guide grooves provided on the bottom plate. The liquid crystal module 10 has right and left sides, each of which is provided with two projecting portions 16 as engagement parts. The two projecting portions 16 are distanced from each other and are positioned close to the opposite corners at opposite ends of each of the right and left sides of the liquid crystal module 10. The bottom plate 20 has right and left rims which have inside right and left rim faces 20b and 20c. Each of the inside right and left rim faces 20b and 20c has two guide grooves 26 at corresponding positions to the above two projecting portions 16, so that the four guide grooves 26 are engaged with the four projecting portions 16. Each of the guide grooves 26 comprises a first guide groove portion 26a and a second glide groove portion 26b connected with the first guide groove portion 26a. The first guide groove portion 26a extends in the thickness direction of the bottom plate 20. The second guide groove portion 26b extends in a longitudinal direction of the right and left rim portions of the bottom plate 20. Namely, the second guide groove portion 26b extends perpendicular to the first guide groove portion 26a, so as to form a L-shape of the guide groove 26. Further, each of the guide grooves 26 has elastic members 26c to form a pinch in the second guide groove portion 26b in the vicinity of the corner of the L-shape of the guide groove 26. When the liquid crystal module 10 is pushed into the bottom plate 20, then the projecting portions 16 are inserted through the first guide groove portion 26a of the guide groove 26. Further the liquid crystal module 10 slides onto the bottom plate 20, so that the projecting portions 16 are moved along the second guide groove portion 26b of the guide groove 26, wherein the projecting portions 16 are made into contact with the narrowed portions of the elastic members 26c whereby the narrowed portions of the elastic members 26c are opened and widen to allow the projecting portions 16 to enter into the second guide groove portion 26b of the guide groove 26. The liquid crystal module 10 slides onto the bottom plate 20 until the projecting portions 16 are made into contact with the ends of the elastic members 26c accommodated in the second guide groove portion 26b of the guide groove 26, and further the opened elastic members 26c are returned to the original form to have the narrowed or pinched portions, whereby the projecting portions 16 are engaged with the guide groove 26 and the narrowed or pinched portions of the elastic members 26c prevent the projecting portions 16 from returning to the first guide groove portion 26a.

Figure 15:
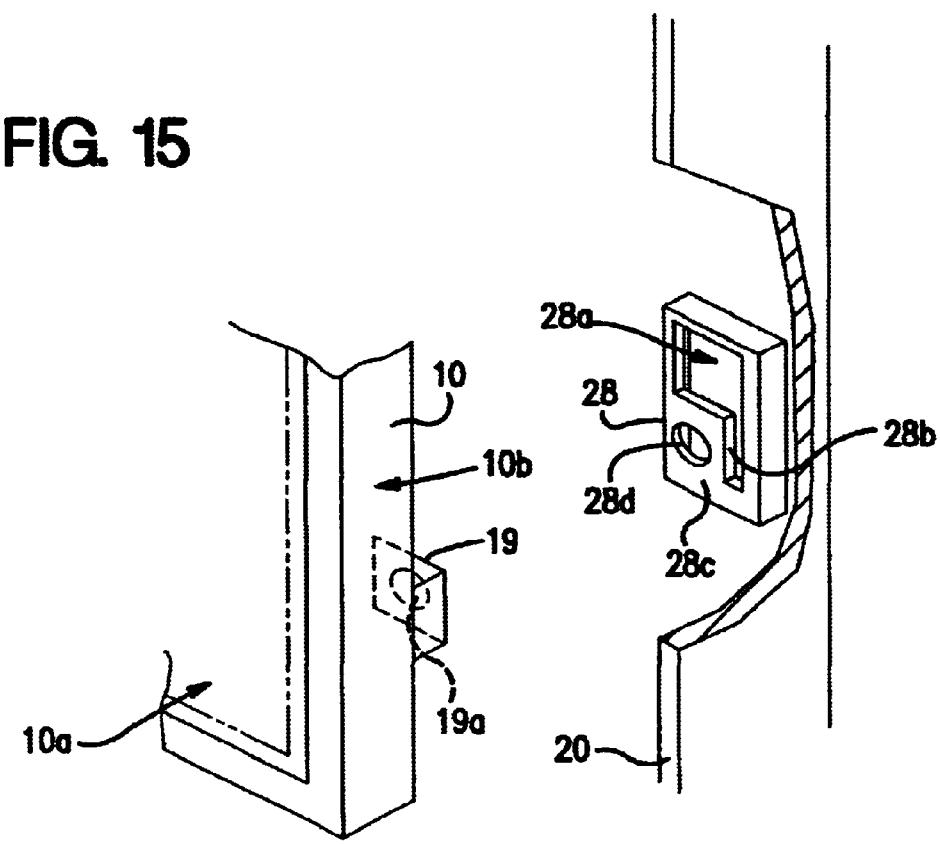
FIG. 15 is a fragmentary cross sectional elevation view illustrative of still another modified engagement structure between the L-shaped projecting pieces provided on the liquid crystal module and a box-shaped engagement portions provided on the bottom plate.
Figure 16:
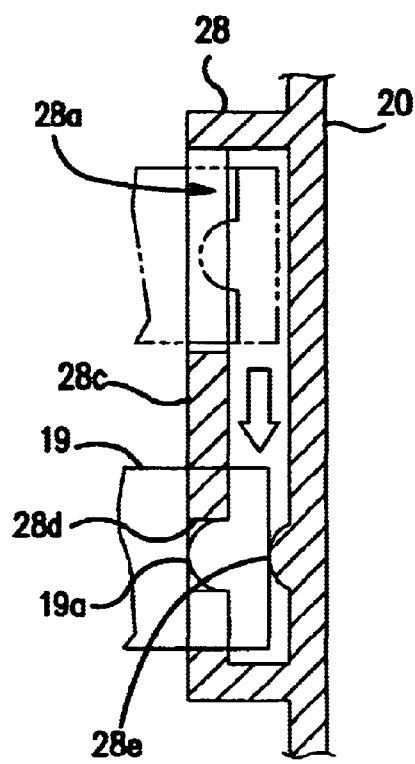
FIG. 16 is a fragmentary cross sectional elevation view illustrative of an engagement structure of FIG. 15.

The engagement structure shown in FIG. 12 may further be modified as follows. FIG. 15 is a fragmentary cross sectional elevation view illustrative of still another modified engagement structure between the L-shaped projecting pieces provided on the liquid crystal module and a box-shaped engagement portions provided on the bottom plate. FIG. 16 is a fragmentary cross sectional elevation view illustrative of an engagement structure of FIG. 15. The liquid crystal module 10 has right and left sides, each of which is provided with two L-shaped projecting pieces 19 as engagement parts. The two L-shaped projecting pieces 19 are distanced from each other and are positioned close to the opposite corners at opposite ends of each of the right and left sides of the liquid crystal module 10. Each of the L-shaped projecting pieces 19 has a projected front portion which is parallel to the display surface of the liquid crystal module. The projected front portion of the each of the L-shaped projecting pieces 19 has a convex portion 19a. The bottom plate 20 has four box-shaped engagement parts 28 at corresponding positions to the above four L-shaped projecting pieces 19. Each of the box-shaped engagement parts 28 has a square-shaped opening portion 28a, a guide groove 28b connected with the square-shaped opening portion 28a, a holding wall 28c adjacent to the square-shaped opening portion 28a and to the guide groove 28b, and a hole 28d formed in the holding wall 28c. The square-shaped opening portion 28a has a corresponding size to the projected front portion of the L-shaped projecting piece 19 so as to allow the projected front portion of the L-shaped projecting piece 19 to enter through the square-shaped opening portion 28a into the box-shaped engagement part 28. The L-shaped projecting piece 19 comprises a projecting base portion and the projected front portion which is supported by the projecting base portion. The projecting base portion extends in the thickness direction of the liquid crystal module 10, so that the projecting base portion is vertical to the projected front portion. The guide groove 28b has such a width as allowing a projecting base portion of the L-shaped projecting piece 19 to move along the guide groove 28b when the liquid crystal module 10 slides onto the bottom plate 20 after the projected front portion of the L-shaped projecting piece 19 has entered through the square-shaped opening portion 28a into the box-shaped engagement part 28. As the projecting base portion of the L-shaped projecting piece 19 moves along the guide groove 28b by moving the liquid crystal module 10 to slide onto the bottom plate 20, the projected front portion of the L-shaped projecting piece 19 comes corresponding in position to an inside face of the holding wall 28c of the box-shaped engagement part 28, whereby the convex portion 19a on the projected front portion is snapped into the hole 28d of the box-shaped engagement part 28, so that the four box-shaped engagement parts 28 are engaged with the four L-shaped projecting pieces 19.

In this embodiment, the L-shaped projecting pieces 19 are provided on the right and left side faces of the liquid crystal module 10 whilst the box-shaped engagement parts 28 are provided on the bottom plate 20 of the cover. As a further modification, it is possible that the L-shaped projecting pieces 19 are provided on the top and bottom side faces of the liquid crystal module 10 whilst the box-shaped engagement parts 28 are provided on the bottom plate 20 of the cover.

Fourth Embodiment

Figure 17:
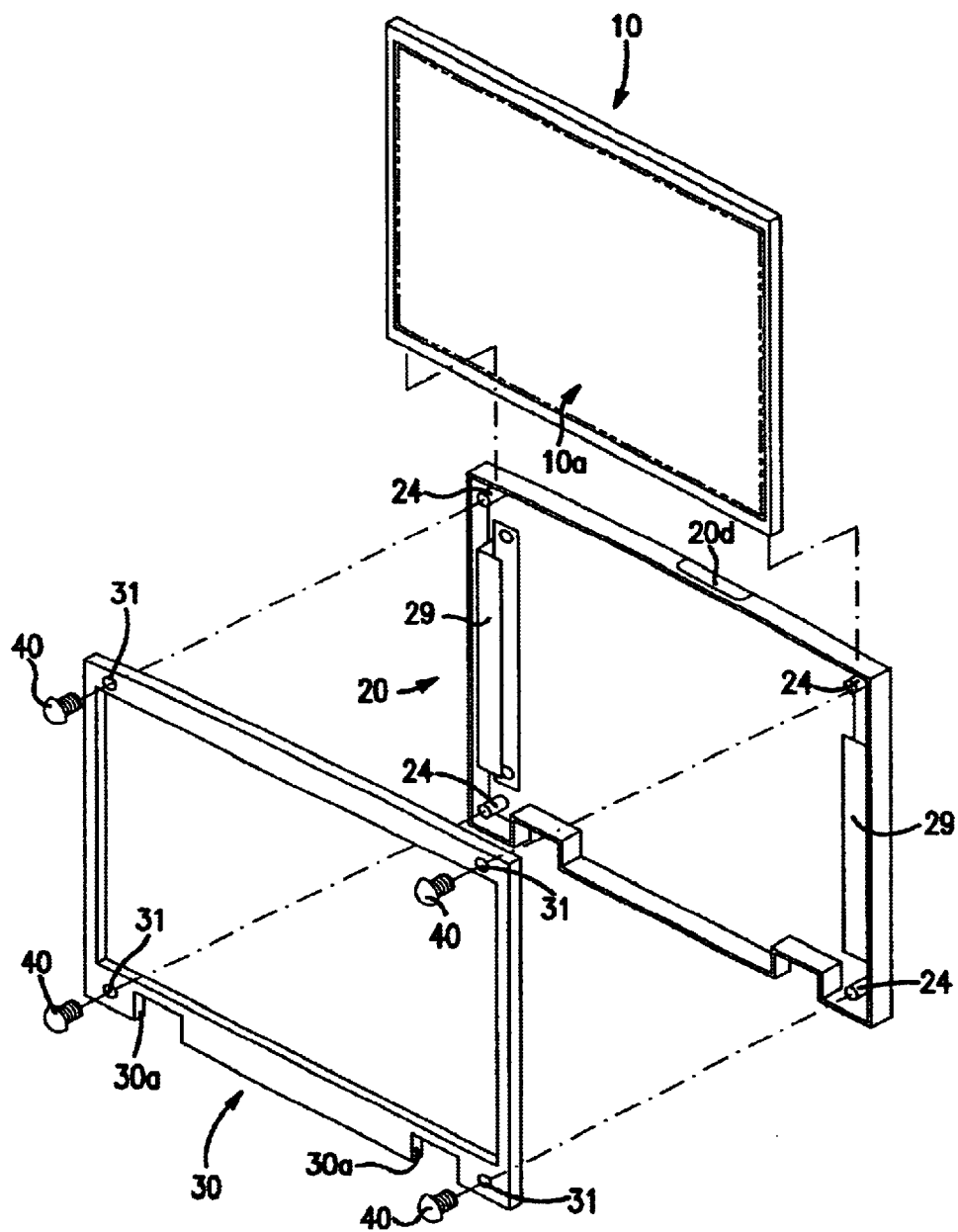
FIG. 17 is a perspective view illustrative of a liquid crystal module mounting structure for mounting a liquid crystal module to a structural frame of a cover of a personal computer in a fourth embodiment in accordance with the present invention.

A fourth embodiment according to the present invention will be described in detail with reference to the drawings. FIG. 17 is a perspective view illustrative of a liquid crystal module mounting structure for mounting a liquid crystal module to a structural frame of a cover of a personal computer in a fourth embodiment in accordance with the present invention. In this embodiment, a pair of right and left metal guide members 29 are provided both for increasing the mechanical strength of the cover accommodating the liquid crystal module 10 and for mounting the liquid crystal module 10.

A liquid crystal module 10 is mounted to a pair of right and left metal guide members 29. The right and left metal guide members 29 are attached to a bottom plate 20 of a cover of a personal computer. An outside frame 30 is attached to the bottom plate 20. The bottom plate 20 and the outside frame 30 are made of a plastic. The right and left metal guide members 29 are made of a metal. The bottom plate 20 faces to the back face of the liquid crystal module 10. The liquid crystal module 10 has a display face 10a which is opposite to the back face. The liquid crystal module 10 is disposed between the bottom plate 20 and the outside frame 30 of the cover. The liquid crystal module 10 is mounted to the right and left metal guide members 29 without using any mounting tools. The liquid crystal module 10 sides along the right and left metal guide members 29 until the right and left sides of the liquid crystal module 10 come tightly fitting with the right and left metal guide members 29, whereby the liquid crystal module 10 is mounted to the right and left metal guide members 29. The outside frame 30 is attached to the bottom plate 20 of the cover by the following attachment tools.

The structure of the liquid crystal module 10 is the same as in the first embodiment and shown in FIG. 6, for which reason descriptions of the structure of the liquid crystal module 10 will be omitted to prevent the exactly duplicate descriptions.

The outside frame 30 is attached to the bottom plate 20 by use of four screws 40. The outside frame 30 has four screw holes 31 in the vicinity of the four corners of the outside frame 30. The bottom plate 20 has four screw receiving portions 24 in the vicinity of the four corners of the bottom plate 20 namely at the corresponding positions to the four screw holes 31, so that when the outside frame 30 comes together with the bottom plate 20, the four screw receiving portions 24 are aligned to the four screw holes 31 of the outside frame 30, whereby the four screws 40 are screwed from the four screw holes 31 into the four screw receiving portions 24, in order to attach the outside frame 30 to the bottom plate 20. Each of the four screw receiving portions 24 comprises a cylindrically shaped part extending in a thickness direction of the bottom plate 20. The cylindrically shaped part has a threaded hole 25, into which the screw 40 is inserted.

Figure 18:
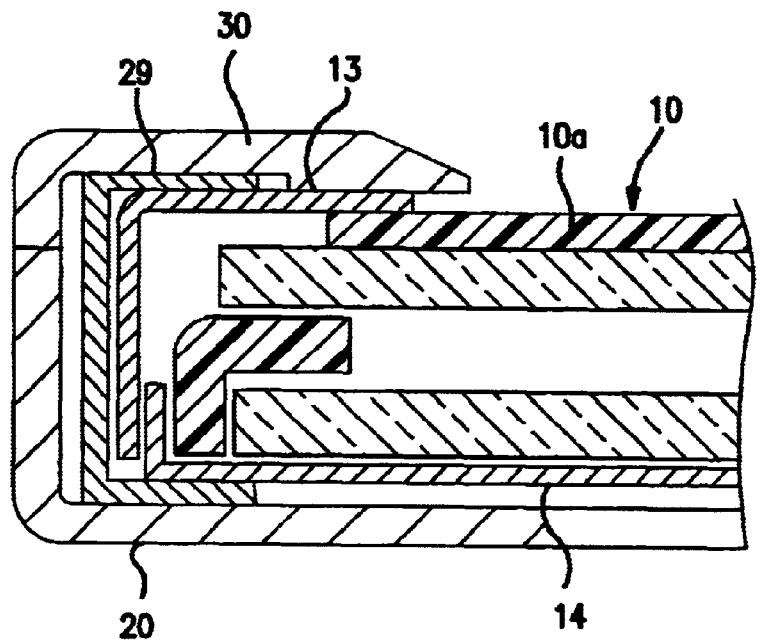
FIG. 18 is a fragmentary cross sectional elevation view illustrative of an engagement structure between the right and left metal guide members and the liquid crystal module.

FIG. 18 is a fragmentary cross sectional elevation view illustrative of an engagement structure between the right and left metal guide members and the liquid crystal module. The liquid crystal module 10 is mounted to the right and left metal guide members 29 without using any mounting tools. The liquid crystal module 10 sides along the right and left metal guide members 29 until the right and left sides of the liquid crystal module 10 come tightly fitting with the right and left metal guide members 29, whereby the liquid crystal module 10 is mounted to the right and left metal guide members 29. The outside frame 30 is attached to the bottom plate 20 of the cover by the following attachment tools.

With reference back to FIG. 17, the bottom plate 20 has a bottom rim which has two recesses 20a which are distanced from each other. The outside frame 30 also has a bottom side which has two recesses 30a at corresponding positions to the two recesses 20a. The recesses 20a and 30a are formed for accommodations of hinge tools which hinge the cover to the body.

As described above, the liquid crystal module 10 is mounted to the right and left metal guide members 29 without using any mounting tools. The liquid crystal module 10 sides along the right and left metal guide members 29 until the right and left sides of the liquid crystal module 10 come tightly fitting with the right and left metal guide members 29, whereby the liquid crystal module 10 is mounted to the right and left metal guide members 29. The outside frame 30 is further attached to the bottom plate 20 by the screws 40 so that the peripheral portion of the liquid crystal module 10 is sandwiched between the outside frame 30 and the bottom plate 20 and also held between the of the right and left metal guide members 29, whereby the liquid crystal module 10 is accommodated in the cover. The right and left metal guide members 29 increase the mechanical strength of the cover accommodating the liquid crystal module 10 and the liquid crystal module 10 is mounted through the right and left metal guide members 29 to the bottom plate 20 of the cover.

In accordance with the present invention, the right and left metal guide members 29 are provided for increasing the mechanical strength of the cover accommodating the liquid crystal module 10 and also for allowing the liquid crystal module 10 to be mounted through the right and left metal guide members 29 to the bottom plate 20 of the cover.

The provision of the right and left metal guide members 29 which increase the mechanical strength allows a reduction of the mechanical strengths of the bottom plate 20 and the outside frame 30. This means it possible to reduce the weights of the bottom plate 20 and the outside frame 30, whereby the weight of the cover can be reduced.

The right and left metal guide members 29 are attached to the bottom plate 20, for which reason the bottom plate 20 made of the plastic is free of any engagement portions for allowing the liquid crystal module 10 to be mounted to the bottom plate 20, whereby the number of the necessary molding processes for forming the bottom plate 20 made of the plastic can be reduced. The reduction in the number of the necessary molding processes for forming the bottom plate 20 allows a reduction of the manufacturing cost.

The right and left metal guide members 29 are provided, which are attached to the bottom plate 20 of the cover respectively, so that only movement of the liquid crystal module 10 to slide along the right and left metal guide members 29 and slide onto the bottom plate 20 mounts the liquid crystal module 10 through the right and left metal guide members 29 to the bottom plate 20 as the structural member of the cover. This novel mounting structure for mounting the liquid crystal module 10 to the bottom plate 20 as the structural member of the cover does never need to provide a screw formation region of the conventional mounting structure described above. Namely, the novel mounting structure for mounting the liquid crystal module 10 to the bottom plate 20 as the structural member of the cover does never utilizes the screw.

Thus, the screw-free mounting structure in accordance with the present invention is free from the conventional problem in that the thickness of the liquid crystal module 10 should be decided dependent upon the screws on the basis of the necessary strength in tightly fixing the liquid crystal module 10 to the cover. Namely, the screw-free mounting structure makes it possible to reduce the thickness of the liquid crystal module 10 with keeping the necessary fixing or mounting strength.

Thus, the screw-free mounting structure in accordance with the present invention is free from the conventional problem with the conventional side mount type liquid crystal module mounting structure. No use of screws nor formations of screw holes do need no margin on the side portions for driving the screws, resulting in narrowing the width of the liquid crystal module 10. Further, no space is formed between the outside frame and the back-light portion. No space makes it possible to increase a ratio in area of a display surface to the entire part of the liquid crystal module 10, even the area of the liquid crystal module 10 is limited by the cover to which the liquid crystal module 10 is mounted.

Further, no use of the screw results in no screw hole formation portion extending in a thickness direction of the liquid crystal module 10. No screw hole formation portion does not need any margins. No margins make it possible to further reduce the thickness of the liquid crystal module.

No formation of any screw formation portion makes the mobile terminal free from the conventional problem with limitation in laying out the driver IC. This means that a freedom in design of signal lines of the driver IC is increased. No formation of the screw formation region makes it possible to obtain an optimum layout of the signal lines of the driver IC.

As described above, no use of metal material further provides an advantage in being free from the conventional problem with a possible generation of a metal broken piece, which may form a short circuit on an electronic circuit.

No use of the screws nor formation of the screw formation regions further provide an advantage in being free from the conventional problem in that if the mobile terminal mounted with the side mount liquid crystal module receives an external shock, then a mechanical stress due to the received shock is concentrated to the screw formation region. No use of the screws nor formation of the screw formation regions makes the liquid crystal panel and the outside frame free from damages due to the mechanical stress due to the received shock.

The cover of the mobile terminal has no screw receiving portion for receiving the screw, for which reason a slide mold is not necessary to form the cover. This means that the cost for forming the manufacturing line may be reduced.

The above novel mounting structure of the liquid crystal module 10 is convenient in removing the liquid crystal module 10 from the cover because the liquid crystal module 10 is mounted through the right and left metal guide members 29 to the bottom plate 20 as the structural frame of the cover by only a single operation of moving the liquid crystal module 10 to slide along the right and left metal guide members 29 and slides onto the bottom plate 20 as the structural frame of the cover.

No use of the screws means no formation of the screw receiving portions, for which reason the screw hole formation region is required to have a high strength by use of a high strength metal such as Mg allow which is, however, expensive and heavy and has a low formability.

Fifth Embodiment

Figure 19:
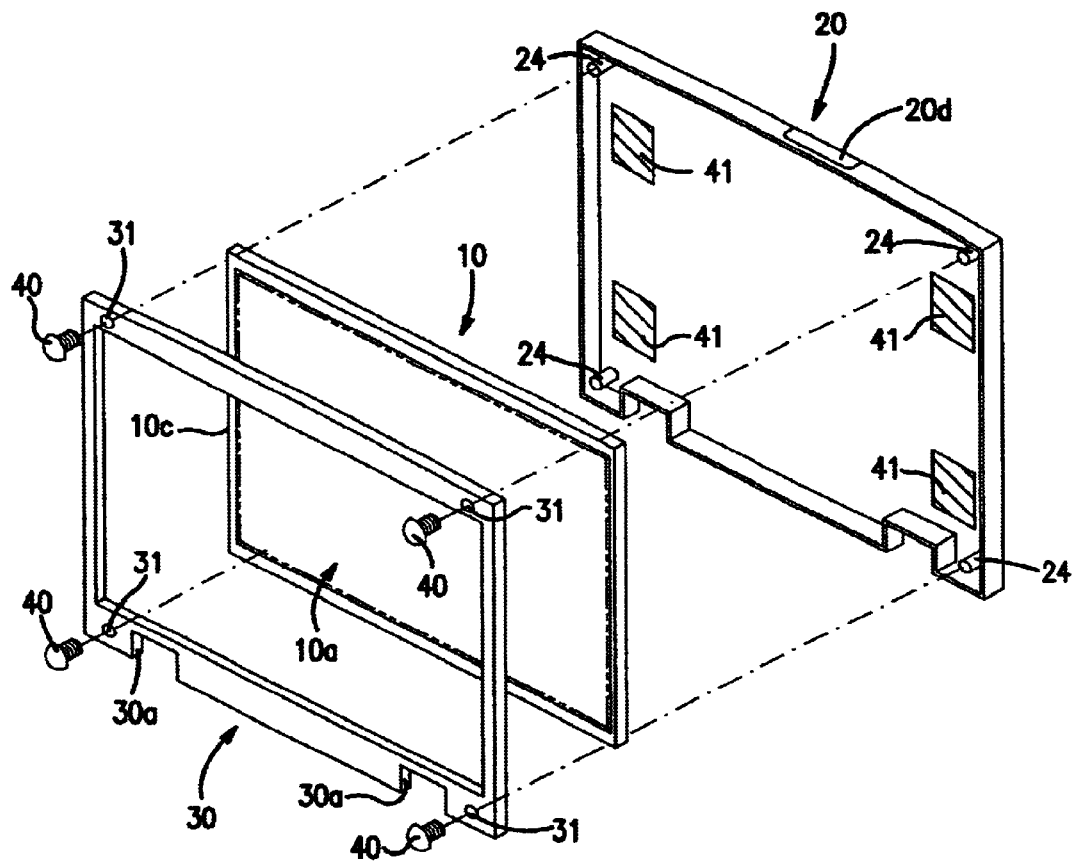
FIG. 19 is a perspective view illustrative of a liquid crystal module mounting structure for mounting a liquid crystal module to a structural frame of a cover of a personal computer in a fifth embodiment in accordance with the present invention.

A fifth embodiment according to the present invention will be described in detail with reference to the drawings. FIG. 19 is a perspective view illustrative of a liquid crystal module mounting structure for mounting a liquid crystal module to a structural frame of a cover of a personal computer in a fifth embodiment in accordance with the present invention. In this embodiment, a set of four adhesive tapes 41 are provided on the bottom plate 20 for adhering the liquid crystal module 10 to the bottom plate 20 as the structural member of the cover.

A liquid crystal module 10 is mounted via a set of four adhesive tapes 41 to the bottom plate 20 of the cover. The four adhesive tapes 41 are attached to the bottom plate 20. An outside frame 30 is attached to the bottom plate 20. The bottom plate 20 and the outside frame 30 are made of a plastic. The bottom plate 20 with the four adhesive tapes 41 faces to the back face of the liquid crystal module 10. The liquid crystal module 10 has a display face 10a which is opposite to the back face. The liquid crystal module 10 is disposed between the bottom plate 20 and the outside frame 30 of the cover. The liquid crystal module 10 is mounted to the bottom plate 20 via the four adhesive tapes 41 without using any further mounting tools. The liquid crystal module 10 is pushed to the bottom plate 20, so that the back face of the liquid crystal module 10 is made into contact with and adhesion with the four adhesive tapes 41, whereby the liquid crystal module 10 is mounted to the bottom plate 20 via the four adhesive tapes 41. The outside frame 30 is attached to the bottom plate 20 of the cover by the following attachment tools.

The structure of the liquid crystal module 10 is the same as in the first embodiment and shown in FIG. 6, for which reason descriptions of the structure of the liquid crystal module 10 will be omitted to prevent the exactly duplicate descriptions.

The outside frame 30 is attached to the bottom plate 20 by use of four screws 40. The outside frame 30 has four screw holes 31 in the vicinity of the four corners of the outside frame 30. The bottom plate 20 has four screw receiving portions 24 in the vicinity of the four corners of the bottom plate 20 namely at the corresponding positions to the four screw holes 31, so that when the outside frame 30 comes together with the bottom plate 20, the four screw receiving portions 24 are aligned to the four screw holes 31 of the outside frame 30, whereby the four screws 40 are screwed from the four screw holes 31 into the four screw receiving portions 24, in order to attach the outside frame 30 to the bottom plate 20. Each of the four screw receiving portions 24 comprises a cylindrically shaped part extending in a thickness direction of the bottom plate 20. The cylindrically shaped part has a threaded hole 25, into which the screw 40 is inserted.

Figure 20:
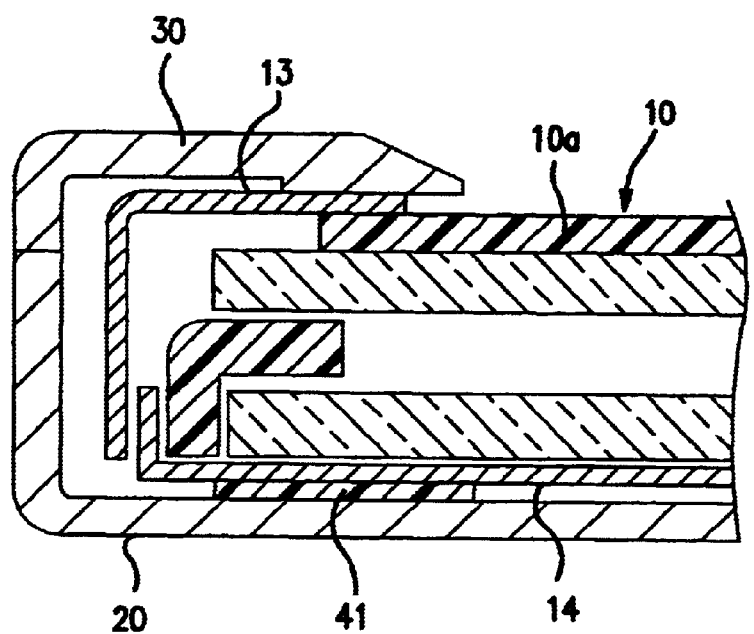
FIG. 20 is a fragmentary cross sectional elevation view illustrative of an engagement structure between the liquid crystal module and the bottom plate via the adhesive tapes.

FIG. 20 is a fragmentary cross sectional elevation view illustrative of an engagement structure between the liquid crystal module and the bottom plate via the adhesive tapes. The liquid crystal module 10 is adhered to the four adhesive tapes 41 to mount the liquid crystal module 10 to the bottom plate 20 without using any mounting tools. The liquid crystal module 10 is pushed to the bottom plate 20, so that the back face of the liquid crystal module 10 is adhered to the adhesive tapes 41, whereby the liquid crystal module 10 is mounted via the four adhesive tapes 41 to the bottom plate 20 of the cover. The outside frame 30 is attached to the bottom plate 20 of the cover by the following attachment tools.

With reference back to FIG. 19, the bottom plate 20 has a bottom rim which has two recesses 20a which are distanced from each other. The outside frame 30 also has a bottom side which has two recesses 30a at corresponding positions to the two recesses 20a. The recesses 20a and 30a are formed for accommodations of hinge tools which hinge the cover to the body.

As described above, the liquid crystal module 10 is mounted to the bottom plate via the four adhesive tapes 41 without using any further mounting tools. The liquid crystal module 10 sides along the four adhesive tapes 41 until the right and left sides of the liquid crystal module 10 come tightly fitting with the four adhesive tapes 41, whereby the liquid crystal module 10 is mounted to the four adhesive tapes 41. The outside frame 30 is further attached to the bottom plate 20 by the screws 40 so that the peripheral portion of the liquid crystal module 10 is sandwiched between the outside frame 30 and the bottom plate 20 and also held between the of the four adhesive tapes 41, whereby the liquid crystal module 10 is accommodated in the cover. Each of the adhesive tapes 41 may comprise a rubber tape having both faces which are applied with an adhesive agent. The four adhesive tapes 41 make a gap between the bottom plate 20 and the back face of the liquid crystal module 10, whereby the bottom plate 20 is prevented from contacting with the back face of the liquid crystal module 10. The separation of the liquid crystal module 10 from the bottom plate 20 may prevent transmission of any vibration of the liquid crystal module 10.

In accordance with the present invention, the four adhesive tapes 41 are provided for allowing the liquid crystal module 10 to be mounted through the four adhesive tapes 41 to the bottom plate 20 of the cover.

The four adhesive tapes 41 are attached to the bottom plate 20, for which reason the bottom plate 20 made of the plastic is free of any engagement portions for allowing the liquid crystal module 10 to be mounted to the bottom plate 20, whereby the number of the necessary molding processes for forming the bottom plate 20 made of the plastic can be reduced. The reduction in the number of the necessary molding processes for forming the bottom plate 20 allows a reduction of the manufacturing cost. Further, it is possible to increase the freedom of the design of the module.

The four adhesive tapes 41 are provided, which are attached to the bottom plate 20 of the cover respectively, so that only movement of the liquid crystal module 10 to slide along the four adhesive tapes 41 and slide onto the bottom plate 20 mounts the liquid crystal module 10 through the four adhesive tapes 41 to the bottom plate 20 as the structural member of the cover. This novel mounting structure for mounting the liquid crystal module 10 to the bottom plate 20 as the structural member of the cover does never need to provide a screw formation region of the conventional mounting structure described above. Namely, the novel mounting structure for mounting the liquid crystal module 10 to the bottom plate 20 as the structural member of the cover does never utilizes the screw.

Thus, the screw-free mounting structure in accordance with the present invention is free from the conventional problem in that the thickness of the liquid crystal module 10 should be decided dependent upon the screws on the basis of the necessary strength in tightly fixing the liquid crystal module 10 to the cover. Namely, the screw-free mounting structure makes it possible to reduce the thickness of the liquid crystal module 10 with keeping the necessary fixing or mounting strength.

Thus, the screw-free mounting structure in accordance with the present invention is free from the conventional problem with the conventional side mount type liquid crystal module mounting structure. No use of screws nor formations of screw holes do need no margin on the side portions for driving the screws, resulting in narrowing the width of the liquid crystal module 10. Further, no space is formed between the outside frame and the back-light portion. No space makes it possible to increase a ratio in area of a display surface to the entire part of the liquid crystal module 10, even the area of the liquid crystal module 10 is limited by the cover to which the liquid crystal module 10 is mounted.

Further, no use of the screw results in no screw hole formation portion extending in a thickness direction of the liquid crystal module 10. No screw hole formation portion does not need any margins. No margins make it possible to further reduce the thickness of the liquid crystal module.

No formation of any screw formation portion makes the mobile terminal free from the conventional problem with limitation in laying out the driver IC. This means that a freedom in design of signal lines of the driver IC is increased. No formation of the screw formation region makes it possible to obtain an optimum layout of the signal lines of the driver IC.

As described above, no use of metal material further provides an advantage in being free from the conventional problem with a possible generation of a metal broken piece, which may form a short circuit on an electronic circuit.

No use of the screws nor formation of the screw formation regions further provide an advantage in being free from the conventional problem in that if the mobile terminal mounted with the side mount liquid crystal module receives an external shock, then a mechanical stress due to the received shock is concentrated to the screw formation region. No use of the screws nor formation of the screw formation regions makes the liquid crystal panel and the outside frame free from damages due to the mechanical stress due to the received shock.

The cover of the mobile terminal has no screw receiving portion for receiving the screw, for which reason a slide mold is not necessary to form the cover. This means that the cost for forming the manufacturing line may be reduced.

The above novel mounting structure of the liquid crystal module 10 is convenient in removing the liquid crystal module 10 from the cover because the liquid crystal module 10 is mounted through the four adhesive tapes 41 to the bottom plate 20 as the structural frame of the cover by only a single operation of pushing the liquid crystal module 10 onto the bottom plate 20 as the structural frame of the cover.

No use of the screws means no formation of the screw receiving portions, for which reason the screw hole formation region is required to have a high strength by use of a high strength metal such as Mg allow which is, however, expensive and heavy and has a low formability.

Sixth Embodiment

Figure 21:
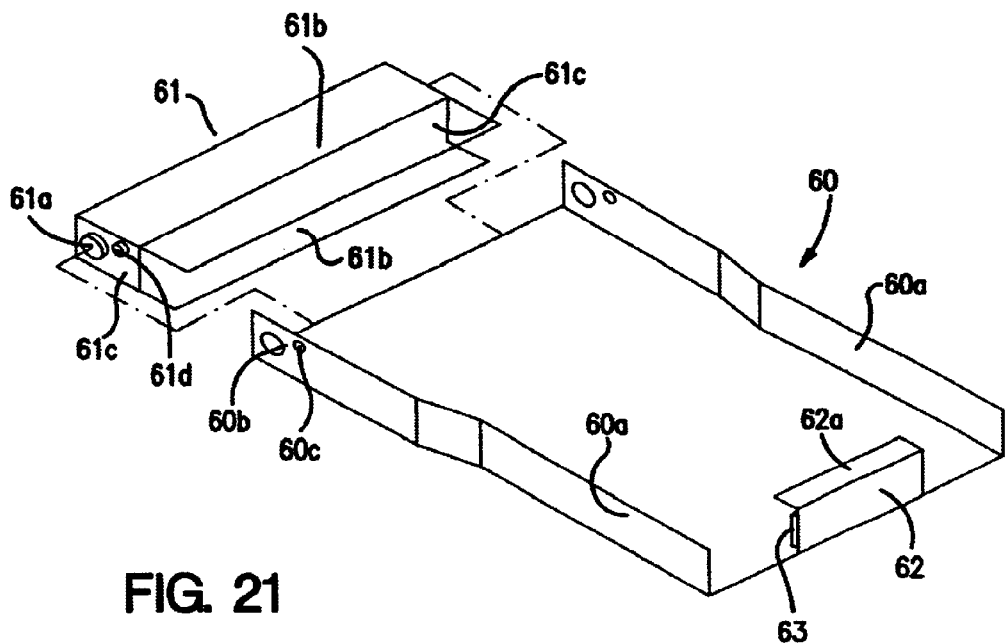
FIG. 21 is a perspective view illustrative of a bottom plate having a liquid crystal module mounting structure for mounting a liquid crystal module to a bottom frame of a cover of a personal computer in a sixth embodiment in accordance with the present invention.
Figure 22:
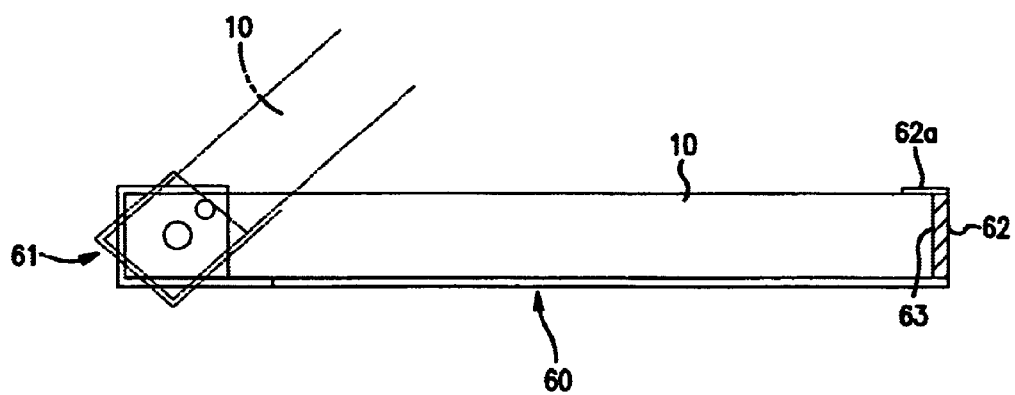
FIG. 22 is a fragmentary cross sectional view illustrative of a liquid crystal module held by a rotational holder attached to a bottom plate of a cover.

A sixth embodiment according to the present invention will be described in detail with reference to the drawings. FIG. 21 is a perspective view illustrative of a bottom plate having a liquid crystal module mounting structure for mounting a liquid crystal module to a bottom frame of a cover of a personal computer in a sixth embodiment in accordance with the present invention. FIG. 22 is a fragmentary cross sectional view illustrative of a liquid crystal module held by a rotational holder attached to a bottom plate of a cover. A cover 102 of the personal computer comprises a bottom plate 60 and a rotational holder 61 for holding a liquid crystal module 10. The rotational holder 61 is pivotally attached to one side of the bottom plate 60. The bottom plate 60 has two side walls 60a on first opposite sides. The rotational holder 61 is attached to one of the second opposite sides of the bottom plate 61. A latch member 62 is provided on another of the second opposite sides of the bottom plate 61. The latch member 62 has a roof which contacts with an upper face of the liquid crystal module 10. The latch member 62 also has a elastic member 63 which pushes the liquid crystal module 10 toward the rotational holder 61. Each of the side walls 60a of the bottom plate 60 has a large hole 60b and a small hole 60c in the vicinity of the one of the first opposite sides of the bottom plate 60. The rotational holder 61 has a slender box-shaped member having two opposite sides 61c, each of which has a large projecting part 61a engaged into the large hole 60b of the bottom plate 60 and a small projecting part 61a engaged into the small hole 60d of the bottom plate 60. The engagement of the large projecting part 61a into the large hole 60b of the bottom plate 60 allows the rotational holder 61 to rotate around an axis extending in parallel to the one of the first opposite sides. The rotational holder 61 also has a pair of top and bottom module supporting plates 61b which extend from the slender box-shaped body for supporting one side of the liquid crystal module 10. One side of the liquid crystal module 10 is inserted into a space between the top and bottom module supporting plates 61b. As the rotational holder 61 is laid down in parallel to the bottom plate 60, then the small projecting parts 61d snap into the small holes 60c of the side walls of the bottom plate 60, and also the liquid crystal module 10 held by the rotational holder 61 is also laid down, so that the liquid crystal module 10 is latched by the latch member 62, whereby the liquid crystal module 10 is pushed by the elastic member 63 toward the rotational holder 61. Further, a distance between the side walls 60a of the bottom plate 60 is made narrow at least in the vicinity of the side having the latch member 62 so that the liquid crystal module 10 held by the rotational holder 61 is also laid down and the liquid crystal module 10 is made sandwiched between the side walls 60a of the bottom plate 60 at least in the vicinity of the side having the latch member 62. As a result, the liquid crystal module 10 is securely mounted by the rotational holder 61 to the bottom plate 60 of the cover. The elastic member 63 may comprise either a rubber material or a spring member.

In accordance with the present invention, rotational holder 61 are provided for increasing the mechanical strength of the cover accommodating the liquid crystal module 10 and also for allowing the liquid crystal module 10 to be mounted through rotational holder 61 to the bottom plate 60 of the cover.

The provision of rotational holder 61 which increases the mechanical strength allows a reduction of the mechanical strengths of the bottom plate 60. This means it possible to reduce the weights of the bottom plate 60, whereby the weight of the cover can be reduced.

The rotational holder 61 is attached to the bottom plate 60, for which reason the bottom plate 60 is free of any engagement portions for allowing the liquid crystal module 10 to be mounted to the bottom plate 60, whereby the number of the necessary molding processes for forming the bottom plate 60 can be reduced. The reduction in the number of the necessary molding processes for forming the bottom plate 60 allows a reduction of the manufacturing cost.

This novel mounting structure for mounting the liquid crystal module 10 to the bottom plate 60 as the structural member of the cover does never need to provide a screw formation region of the conventional mounting structure described above. Namely, the novel mounting structure for mounting the liquid crystal module 10 to the bottom plate 60 as the structural member of the cover does never utilizes the screw.

Thus, the screw-free mounting structure in accordance with the present invention is free from the conventional problem in that the thickness of the liquid crystal module 10 should be decided dependent upon the screws on the basis of the necessary strength in tightly fixing the liquid crystal module 10 to the cover. Namely, the screw-free mounting structure makes it possible to reduce the thickness of the liquid crystal module 10 with keeping the necessary fixing or mounting strength.

Thus, the screw-free mounting structure in accordance with the present invention is free from the conventional problem with the conventional side mount type liquid crystal module mounting structure. No use of screws nor formations of screw holes do need no margin on the side portions for driving the screws, resulting in narrowing the width of the liquid crystal module 10. Further, no space is formed between the outside frame and the back-light portion. No space makes it possible to increase a ratio in area of a display surface to the entire part of the liquid crystal module 10, even the area of the liquid crystal module 10 is limited by the cover to which the liquid crystal module 10 is mounted.

Further, no use of the screw results in no screw hole formation portion extending in a thickness direction of the liquid crystal module 10. No screw hole formation portion does not need any margins. No margins make it possible to further reduce the thickness of the liquid crystal module.

No formation of any screw formation portion makes the mobile terminal free from the conventional problem with limitation in laying out the driver IC. This means that a freedom in design of signal lines of the driver IC is increased. No formation of the screw formation region makes it possible to obtain an optimum layout of the signal lines of the driver IC.

As described above, no use of metal material further provides an advantage in being free from the conventional problem with a possible generation of a metal broken piece, which may form a short circuit on an electronic circuit.

No use of the screws nor formation of the screw formation regions further provide an advantage in being free from the conventional problem in that if the mobile terminal mounted with the side mount liquid crystal module receives an external shock, then a mechanical stress due to the received shock is concentrated to the screw formation region. No use of the screws nor formation of the screw formation regions makes the liquid crystal panel and the outside frame free from damages due to the mechanical stress due to the received shock.

The cover of the mobile terminal has no screw receiving portion for receiving the screw, for which reason a slide mold is not necessary to form the cover. This means that the cost for forming the manufacturing line may be reduced.

The above novel mounting structure of the liquid crystal module 10 is convenient in removing the liquid crystal module 10 from the cover because the liquid crystal module 10 and the rotational holder 61 attached to the bottom plate 60 as the structural frame of the cover are engaged with each other by only a single operation of fitting the liquid crystal module 10 into the rotational holder 61 as the structural frame of the cover.

No use of the screws means no formation of the screw receiving portions, for which reason the screw hole formation region is required to have a high strength by use of a high strength metal such as Mg allow which is, however, expensive and heavy and has a low formability.

The above described novel mounting structure may be applicable to not only for mounting the liquid crystal module to the mobile personal computer but also for mounting the liquid crystal module to any other mobile terminals. The above described novel mounting structure may be applicable to not only for mounting the liquid crystal module to any mobile terminals including mobile personal computers but also for mounting any display module to any mobile terminals including mobile personal computers.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A panel for a mobile terminal, comprising:

a liquid crystal display (LCD) having a front and a back cover, one of said front and back cover having a side surface that extends generally perpendicular to a plane of the LCD and that has a recess therein;

a frame in which said LCD is mounted and that has a side wall extending generally perpendicular to the plane of the LCD, said side surface of said LCD being interior to and spaced from said sidewall of said frame, said frame having in a space between said side surface and said sidewall a free-standing flexible claw longitudinally extending generally perpendicular to the plane of the LCD directly from an interior surface of said frame that is generally parallel to the plane of the LCD, a distal end of said free-standing flexible claw having a sloped projection with a flat bottom that is generally parallel to the plane of the LCD and that engages said recess to hold said LCD in said frame.

2. The panel of claim 1, comprising a plurality of pairs of said recess and said flexible claw.

\* \* \* \* \*